United States Patent [19]
Lynnworth et al.

[11] Patent Number: 5,440,937
[45] Date of Patent: Aug. 15, 1995

[54] PROCESS AND APPARATUS FOR ULTRASONIC MEASUREMENT OF VOLUMERIC FLOW THROUGH LARGE-DIAMETER STACK

[75] Inventors: Lawrence C. Lynnworth, Waltham; James E. Bradshaw, Tyngsboro; Christopher C. Doyle, Weston; Steven A. Lynnworth, Natick; James E. Matson, Needham; Jeffrey Tilden, Norton, all of Mass.

[73] Assignee: Panametrics, Inc., Waltham, Mass.

[21] Appl. No.: 55,200

[22] Filed: Apr. 30, 1993

[51] Int. Cl.$^6$ .............................................. G01F 1/66
[52] U.S. Cl. ........................... 73/861.29; 73/861.25; 73/861.27
[58] Field of Search .......... 73/861.25, 861.26, 861.27, 73/861.28, 861.29, 861.31, 170.13

[56] References Cited

U.S. PATENT DOCUMENTS

| | | | |
|---|---|---|---|
| 2,874,568 | 2/1959 | Petermann | 73/194 |
| 2,936,619 | 5/1960 | Gibney | 73/194 |
| 3,050,997 | 8/1962 | Lake | 73/194 |
| 3,204,445 | 9/1965 | Kallmann | 73/194 |
| 3,230,766 | 1/1966 | Kallmann | 73/194 |
| 3,236,098 | 2/1966 | Dahlke et al. | 73/194 |
| 3,817,098 | 6/1974 | Brown | 73/194 |
| 4,337,167 | 7/1982 | Tarada | 73/861.28 |
| 4,397,194 | 8/1983 | Soltz | 73/861.28 |
| 4,754,650 | 7/1988 | Smalling et al. | 73/861.28 |

OTHER PUBLICATIONS

Bruner, Ronald F., "Theoretical and Experimental Assessment of Uncertainties in Non-Intrusive, Ultrasonic Flow Measurement," *National Bureau of Standards Special Publications 484*, 1977, pp., 277–290.

Chessell, C. I., "Three dimensional acoustic-ray tracing in an inhomogeneous anisotropic atmosphere using Hamilton's equations," *The Journal of the Acoustical Society of America*, 1973, vol. 53.

Cox, H., "Approximate ray angle diagram," *J. Acoust. Soc. Am.*, Feb. 1977, vol. 61, No. 2, pp. 353–359.

Lynnworth, L. C., "Flexural Wave Externally-Attached Mass Flowmeter for Two-Phase Fluids in Small-Diameter Tubing, 1-MM ID To 16-MM ID," *Ultrasonics Symposium*, 1990, pp. 1557–1562.

Lynworth, L. C., "Ultrasonic Flowmeters," *Physical Acoustics*, (ed. Mason et al.) 1979, vol. 14, pp. 446–449.

Lynnworth et al., "Noninstrusive Ultrasonic Measurement of Flow Velocity And Mass Flow Rate," *Flow-Its Measurement and Control in Science and Industry*, vol. 1, pp. 917–924.

Mylvaganam, K. S., "High-Rangeability Ultrasonic Gas Flowmeter for Monitoring Flare Gas," *IEEE Transactions On Ultrasonics, Ferroelectrics, and Frequency Control*, Mar. 1989, vol. 36, No. 2, pp. 144–149.

Suzuki, N. et al. "Ultrasonic Method Of Flow Measurement in Large Conduits And Open Channels," *Modern Developments in Flow Measurements*, 1972, pp. 115–138.

Parkinson, M. J., "Measurement of the mass flow rate of airborne powdered material in a duct," *Journal of Scientific Instruments (Journal of Physics E)*, 1968, Series 2, vol. 1, pp. 823–824.

Fitzhugh et al., "Volume flow meter for steady and unsteady flow," *Ultrasonics*, 1972, vol. 10, pp. 197–199.

Primary Examiner—Richard E. Chilcot, Jr.
Assistant Examiner—Elizabeth L. Dougherty
Attorney, Agent, or Firm—Lahive & Cockfield

[57] ABSTRACT

An apparatus and method for measuring gas flow velocity through a high stack employs ultrasonic transducers. The transducers are placed on opposite ends of a diameter several hundred feet up, with a small vertical separation L between the transducers. Apparatus for measuring acoustic velocity in the stack gas over short path lengths is also included.

45 Claims, 14 Drawing Sheets

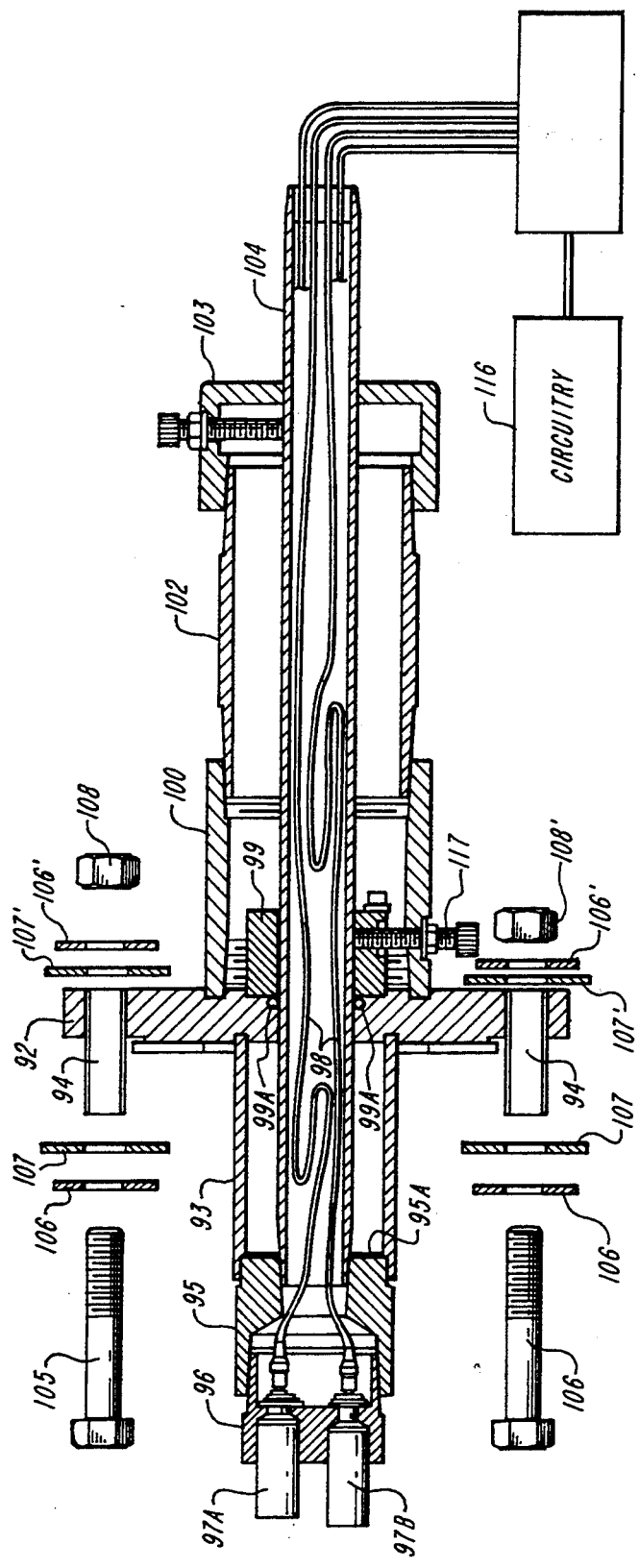
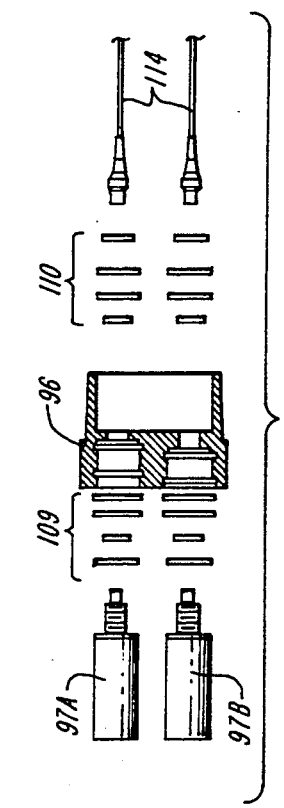
FIG. 10
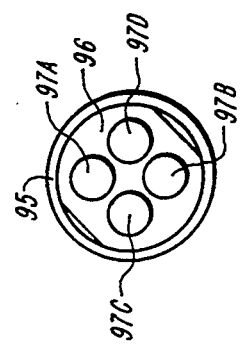
FIG. 10A
FIG. 10B

PROCESS AND APPARATUS FOR ULTRASONIC MEASUREMENT OF VOLUMERIC FLOW THROUGH LARGE-DIAMETER STACK

This invention relates in general to a process end apparatus for ultrasonic measurement of volumetric gas flow through large-diameter stacks.

There is a requirement for about continuously, i.e., frequently monitoring the volumetric flow of gas through, and emitted from, a high stack, such as a thousand foot (approximately 300 m) stack, to provide information necessary under environmental laws and to aid in the control of the process producing the gaseous effluent. A typical flow velocity range for a 30 foot diameter stack is approximately 50 to 120 ft/sec, corresponding to Mach numbers ($M_s$) less than 0.1. This measurement is complicated by the fact that the gas flow is at high temperature, approximately 175°–200° C., and often contains highly corrosive gases, moisture and fly ash or other particulate matter. Because of this contamination of the gas flow it is necessary to provide sensors which are not clogged or easily disabled by the presence of such corrosive and/or abrasive materials in the effluent.

Typically the gas enters the stack horizontally, substantially at its bottom, and flows upwardly for a distance which can be as high as 1,000 feet before emerging from the top of the stack. Since the gas flow originates horizontally and is driven 1,000 feet vertically at velocities typically on the order of 100 ft/sec at the normal maximum power levels of a fossil-fueled electricity generating plant, there is considerable swirl, turbulence and crossflow in the stack. The higher in the stack that the monitoring takes place the more the profile developed so that measurements performed at distances, such as 8 to 10 times the stack diameter above the point of entry of the gas have been found to be suitable for relatively reproducible volumetric flow monitoring. Since the stack typically has an inner diameter of 30 feet, the measurement must be able to take into consideration swirl and crossflow effects and, for the most part, should be mechanically configured to provide for some periodic air purging of the interior of the stack in the area where the monitoring sensors are located to remove contaminant materials from the sensor surfaces.

The present environmental regulations require relative accuracy test audits (RATA's) to be periodically conducted, typically annually or semiannually, depending on the relative accuracy of the sensor being calibrated. This audit entails a detailed evaluation of volumetric flow in one vertically located plane at a series of radial positions across the diameter of the stack to establish a calibration or reference value. This procedure usually takes one or two days and is typically performed with pitot sensors. This audit can be accomplished with one or two pitot sensors orthogonally traversing different radial positions. In profiling some installations, an array of several sensors may be employed, each traversing at a different position. After this calibration has been completed, monitoring is performed on an almost continuous basis until the time for the next required pitot calibration. In this context, almost continuous means at least once every 15 minutes. Thus, while sensor longevity is important, the sensor's duty cycle can be small, <<17. One of the difficulties encountered in the prior art is the difficulty in attaining-accuracy on an absolute scale of the continuous emissions monitoring (CEM). One of the bases of the present invention is the realization that it is not absolute accuracy that is needed, but rather accuracy relative to the pitot measurements. That is, if the monitoring system can maintain an accuracy of, for example, ±7.5% relative to the pitot measurements, this meets one of the important regulatory requirements.

Another difficulty encountered in making these measurements is the high temperature of the gases. Typical temperature for these gases is 175°–200° C. Accordingly, monitoring sensors must be capable of withstanding these temperatures over prolonged periods of time and without deterioration.

Finally, there are the practical problems associated with not only inserting appropriate monitoring sensors in a smoke stack at an elevation of several hundred feet but maintaining these sensors and, when required, quickly replacing sensor heads to reduce exposure times for personnel as well as to minimize the time that continuous measurements are interrupted. With typical prior art ultrasonic installations, two platforms outside the stack are required. Construction and maintenance of two platforms is a very expensive matter, and it is advantageous to achieve the required relative accuracy measurement from only one platform.

One method which has been employed for the measurement of fluids, including gases, in a wide variety of situations is ultrasonic contrapropagation flow measurement. In this technique ultrasonic waves are emitted from a transducer along a path which is typically across a diameter of the conduit containing the flow, and angled, for example at 45°, to obliquely traverse the axis of flow. Such an arrangement has several drawbacks in terms of stack flow monitoring. Since the purpose of the monitoring is to continuously monitor the conditions substantially at the plane in which pitot calibrations were carried out, a 45° interrogation path across a 30 foot diameter results in an ultrasonic measurement over a path extending many feet out of the plane of pitot calibration. As mentioned above, one important irregularity in the flow comes from a cyclonic swirl of gas within the stack. Thus a large vertical displacement of the measurement path from one side of the stack to the other, subjects the measurement to flow disturbances at different elevations in the cyclonic pattern. This tends to result in inaccurate determinations because of changes of vertical flow distribution due in part to changes in crossflow and/or swirl.

The present inventors have found that the attenuation of the ultrasonic wave amplitude from transmitter to receiver is not symmetrical i.e., not reciprocal for upstream and downstream directions. Further, this difference in attenuation appears to increase with increases in the angle of propagation. This difference affects the measured flight time and appears related to nonreciprocity problems of time correlation which become quite severe at propagation angles above 30°.

With significantly large angles from the horizontal used for interrogation paths for the monitoring operation, the vertical displacement between sensors is too large for the sensors to be installed or maintained from a single platform around the stack. Since the cost of erecting permanent platforms at these heights with sufficient safety characteristics is very high, it is desirable to operate with only one platform, preferably the same platform already required for pitot reference measurements.

It is a primary object of the present invention to provide an ultrasonic monitoring system for monitoring the velocity of gases passing through a stack with an accuracy of a few percent relative to the calibration measurements effected within the stack by a regulatory reference detection system such as a pitot traverse.

It is another object of the invention to provide an ultrasonic monitoring system in which the vertical displacement of the sensors along the axis of the stack is sufficiently small to permit installation and maintenance from a single platform.

It is still another object of the present invention to provide an ultrasonic measuring system which will monitor the volumetric flow of gases through a stack with at most only a small displacement from a single plane transverse to the axis of the stack.

It is yet another object of the invention to provide an ultrasonic measurement system for monitoring the volumetric flow through a stack at high temperatures and providing for only periodic or no gas purges at the sensor faces of the ultrasonic transducers.

It is another object of the invention to provide an ultrasonic measuring system for monitoring the volumetric flow of gases through a stack, which can employ clamp-on transducers.

Other objects include providing a stack flow gas measuring system that is; easily maintained by virtue of a quick-disconnect, quick-reconnect installation of the transducers, environmentally-powered, wireless-linked to a remote on-the-ground data acquisition system, and that includes means to deal with corrosive wet abrasive gases flowing at velocities where beam drift and ray rotation is not reciprocal nor negligible.

SUMMARY OF THE INVENTION

Broadly speaking, the ultrasonic monitoring system of the present invention employs ultrasonic transducers which may be oriented to have their central axis of propagation in a direction substantially normal to the vertical axis of the stack, with at most small vertical displacement between transducers on opposite sides of the stack, while providing sufficiently accurate measurements relative to calibration measurements. In such a configuration, the half angle of emission of ultrasonic waves from the emitting transducer can be selected with respect to the gas flow velocity and diameter of the stack, such that the receiving transducer diametrically opposed on an interior wall of the stack can be displaced vertically only a short distance, up to two meters, yet still receive substantial unscattered ultrasonic waves from the transmitter. With this arrangement reasonably accurate measurements of the transit times of ultrasonic bursts across the stack chamber can be made, resulting in relatively accurate measurement of the vertical flow of the gas within the stack. This arrangement can also be employed to make reasonably accurate measurements of the crossflow velocity of the gas to provide for compensation for the crossflow in determining the axial volumetric flow through the stack. If both transducers are located on the same side of the stack, one slightly above the other, to measure over a vee path, crossflow is virtually eliminated.

With either of such arrangements the mechanical mounting for the transducers can be substantially at a 90° angle to the stack wall, allowing for relative ease of manufacturing and installation.

In another embodiment of the invention, the through fittings carrying the ultrasonic transducers through the stack wall can be directed downwardly to avoid collection of condensed moisture, while still permitting the Poynting vector of the emitted ultrasonic radiation to be on an axis normal to the flow axis of the gases, or even slightly inclined vertically up from an axis normal to the flow axis.

DESCRIPTION OF THE DRAWINGS

FIG. 10, FIG. 10A and FIG. 10B are illustrations in cross sectional view of a transducer subassembly suitable for use in the apparatus of this invention;

DESCRIPTION OF PREFERRED EMBODIMENTS

Figure 1:
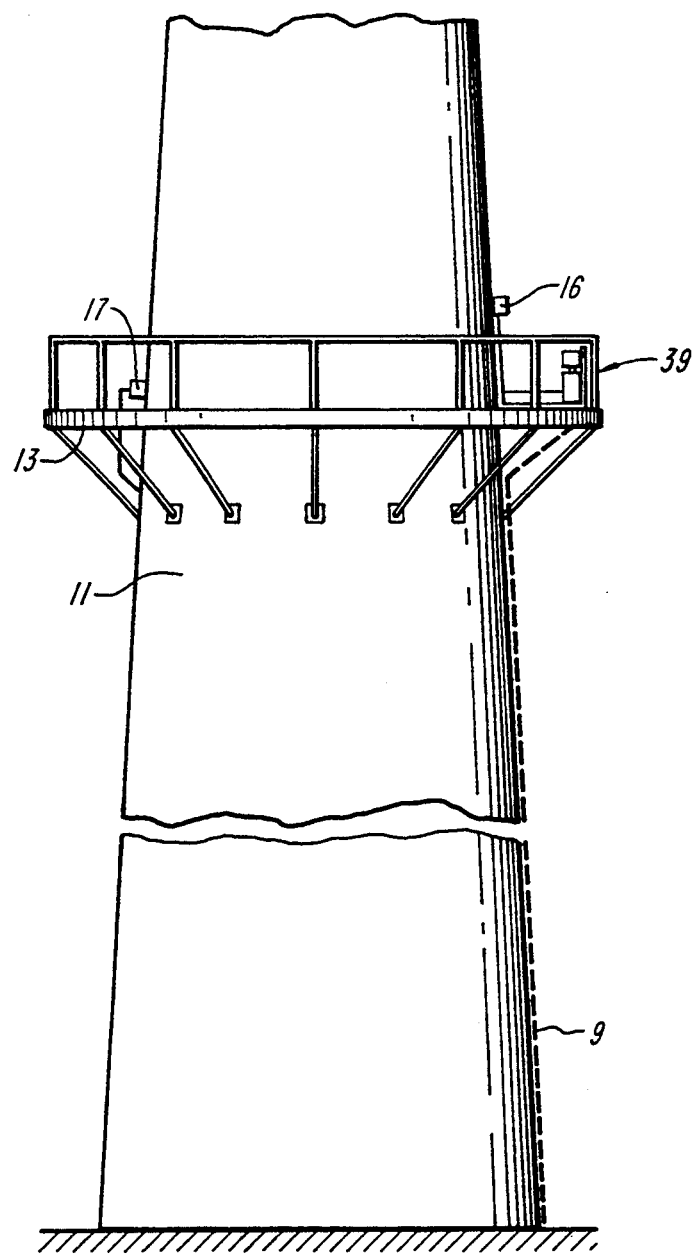
FIG. 1 is an illustration in diagrammatic form of an installation of the apparatus of this invention.

In FIG. 1 there is illustrated a stack 11 from which hot gases which are subject to control under environmental laws, are emitted. Typical heights for this stack may be up to 1,000 feet. At a height well above the ground, typically 250 or 300 feet, a platform 13 is fastened to the wall of the stack. This platform is for the purpose of personnel installing and maintaining ultrasonic transducers and pitot transducers for measurement of the volumetric flow of the stack gases upwardly along the axis of the stack.

In many stacks of this type gases are input to the stack horizontally from a port at or close to ground level and at high temperature, for example, above 170° C. While the temperature of the gas is decreased somewhat in the approximately 3 to 6 seconds it takes the gas to reach the 300 foot level, there still remains a requirement for transducers that will withstand high temperatures. As a result of the hot, high Reynolds number gas, turning after entering the stack horizontally, there is a great deal of turbulence as it moves upward with a generally cyclonic, swirling motion. For reasons of sensing the gas flow at a point where the flow profile is developed and where some of this turbulence has been reduced, and where the temperature may be somewhat reduced, the ultrasonic transducers 16 and 17 are conveniently mounted, as illustrated, several hundred feet above the ground.

In order to comply with environmental regulations which require relative accuracy test audits (RATA's) periodically (for example annually), reference measurements of stack gas flow are taken at a number of radial positions on a single horizontal plane across orthogonal diameters of this stack. These are usually taken with pitot sensors. In addition to these periodic measurements, continuous emissions monitoring (CEM) is required. The ultrasonic transducers employed in the system of this invention serve this purpose of the continuous emissions monitoring. Rather than this monitoring being required to be accurate to some absolute standard, monitoring in this invention is maintained at very high accuracy in relation to the "calibration" of the periodic pitot measurement.

It has been determined that ultrasonic transducers spaced apart vertically by a short distance, L, up to about two meters can be employed with sufficient accuracy of measurement to meet these requirements. In fact this distance L, can be reduced to zero, and measurements can still be obtained. The zero L configuration responds to variations in gas flow velocity with variations in transit time because the emitted beam has an approximately conical envelope widening out from the transducer face, resulting in an effectively lengthened transit path with gas flow. If a plane in that cone is represented by a right triangle where the base is the stack diameter, and the height is the vertical dispersion of the beam below the beam central axis on the opposite stack wall, then ultrasonic waves along the path defined by the hypotenuse of the triangle must traverse a longer path and hence have a longer transit time from one wall of the stack to the other. If the gas flow along the vertical axis of the stack slides the hypotenuse wave path back toward the base of the triangle, then, even though the ultrasonic wave reaches the transducer positioned opposite the transmitter on the same horizontal plane, its transit time will be longer than that of a wave moving directly across the diameter with no vertical gas flow present. This is so because the "hypotenuse" ultrasonic path is not direct, but rather it starts out in a diagonal direction and is carried by the gas flow to reach the directly opposed transducer. Accordingly, while these ultrasonic waves start at an emitting transducer and are received at a transducer at the end of a nontilted stack diameter, they do not travel normal to their wavefront, but rather drift and sometimes curve to the receiving transducer.

The equation for this measurement is set forth below.

$$\Delta t = K N_t (D/2c)(V/c)^2 \quad (1)$$

where $\Delta t$ = increase in transit time to diagonally-opposed transducer due to drift,
D = stack diameter,
c = sound speed,
$N_t$ = number of traverses
K = meter factor that depends on flow profile.

Applicants recognize that while $\Delta t$ is negligible for small D and low flow, it is not negligible for the particular condition of the large smokestack. While the embodiment of FIG. 1 employs two ultrasonic transducers, the zero L configuration can be operated in one embodiment with a single transducer in the pulse echo mode.

Figure 2:
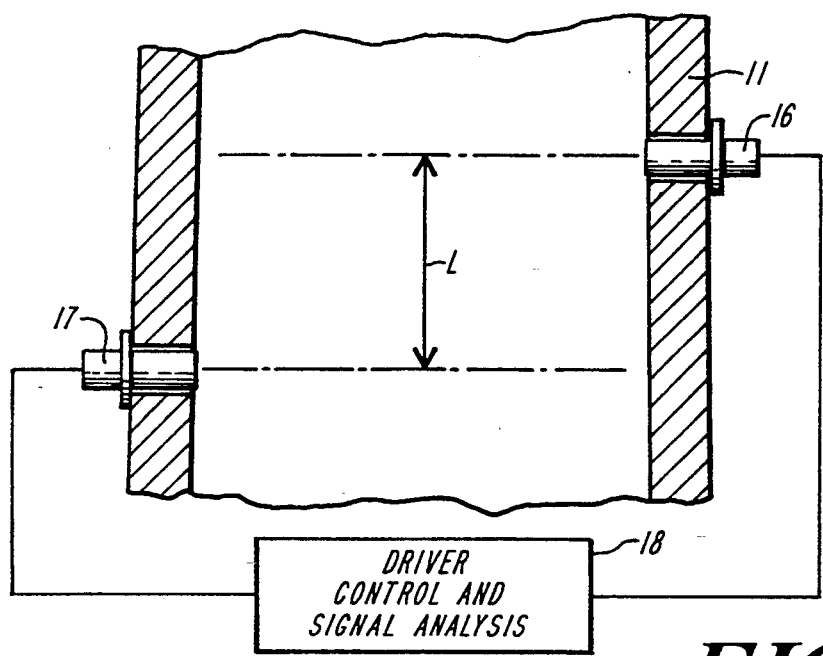
FIG. 2 is a diagrammatic illustration of positioning of sensors in a measurement system constructed in accordance with the principles of this invention.

In the embodiment illustrated in FIG. 2, ultrasonic transducers 16 and 17 are mounted at opposite ends of a tilted diameter of the stack and propagate bursts of emitted ultrasonic waves in a direction normal to the axis of the stack. A driver, control and signal analyzing circuit 18 is coupled to the transducers to provide energizing signals to the transducers in a predetermined sequence and to analyze the returned signals. Such circuits are readily available, for example, from Panemetrics, Inc. of Waltham, Mass. under the designation CEM68. The ultrasonic waves are emitted in a generally conical envelope with a half angle $\theta_h$ of the emitted rays. If $\theta_h \cong M_s$ (the Mach number) and if the vertical separation L between the transducers is less than $D \tan \theta_h$, the ultrasonic waves emitted from the transducer 41 will be detected at transducer 43, under conditions of zero vertical flow velocity, even though each of the transducers is mounted at right angles to the vertical axis of the stack. This relationship between Mach number $M_s$, and half-angle $\theta_h$ is achieved by combining the transducer frequency f, typically 50 kHz, sound velocity c in the hot gas, typically about 1300 ft/sec, and the effective radiating aperture at the face of the crystal, d such that, $$\lambda/d = 2\theta_h. \quad (2)$$

Mounting at right angles to the axis of the stack is advantageous because it renders physical mounting straightforward. Maintaining the displacement L at a short distance, compared to the 30 foot diameter of the stack, is advantageous because the entire measurement is taken close to the horizontal plane in which the pitot measurements are taken, because it does not require a second platform to be erected outside the stack for purposes of installation and maintenance, and because it tends to minimize nonreciprocity distortions from asymmetry between waves propagated in opposite directions.

Such an arrangement using the short L, provides sufficient accuracy since the axial velocity affects the transit times of the propagated ultrasonic waves as shown below.

The following is a derivation of the basic flow-sensing equation for a fluid of uniform sound speed c flowing at a uniform velocity $V < < c$ in a duct of cross-sectional area A, interrogated by two point ultrasonic transducers on the axis and spaced a vertical distance L apart. Neglecting beam drift, ray rotation, and any not-in-the-gas time delay $t_w$, the transit times in the upstream and downstream directions, respectively, are $$t_1 = L/(c-V) \text{ and } t_2 = L/(c+V). \tag{3}$$

The reciprocals of these transit times, multiplied by L, are $$L/t_1 = c-V \text{ and } L/t_2 = c+V. \tag{4}$$

Accordingly, $$V = \frac{L}{2}\left(\frac{1}{t_2} - \frac{1}{t_1}\right) = \frac{L}{2} \frac{\Delta t}{t_1 t_2} \tag{5}$$

and $$c = \frac{L}{2}\left(\frac{1}{t_2} + \frac{1}{t_1}\right) = \frac{L}{2} \frac{\Sigma t}{t_1 t_2}.$$

The upstream-downstream time difference can be obtained from Eq. (4) as $\Delta t = 2LV/(c^2-V^2)$. This can be expressed in terms of the Mach number $M_s = V/c$ for $M_s << 1$:

$$\Delta t = \frac{2LV/c^2}{1-M_S^2} = (2LV/c^2)(1 + M_S^2 + M_S^4 + \ldots). \tag{6}$$

At sufficiently small Mach numbers, the following approximations are valid:

$$V = c^2 \Delta t / 2L \tag{7}$$

and $$\Delta t = 2LV/c^2 \tag{8}$$

Equations (6)-(8) also apply for across-the-stack measurement, to a good approximation. It should be noted that there are other ways of determining c, than from the average transit time across the stack. Several configurations for accomplishing this are illustrated in FIGS. 13, 14, 15, and 16.

While FIG. 2 shows in a simplified diagram, only one pair of transducers 16 and 17, it will be appreciated that a more accurate arrangement is one which uses a crisscross configuration in which a second pair of transducers, similarly displaced by a short vertical distance L, are placed at opposite ends of another tilted diameter of the stack. The term "transducer" is used to mean one or several modules in close proximity to one another and operating in cooperative fashion, including operating as a phased array or a chirped array.

Figure 3:
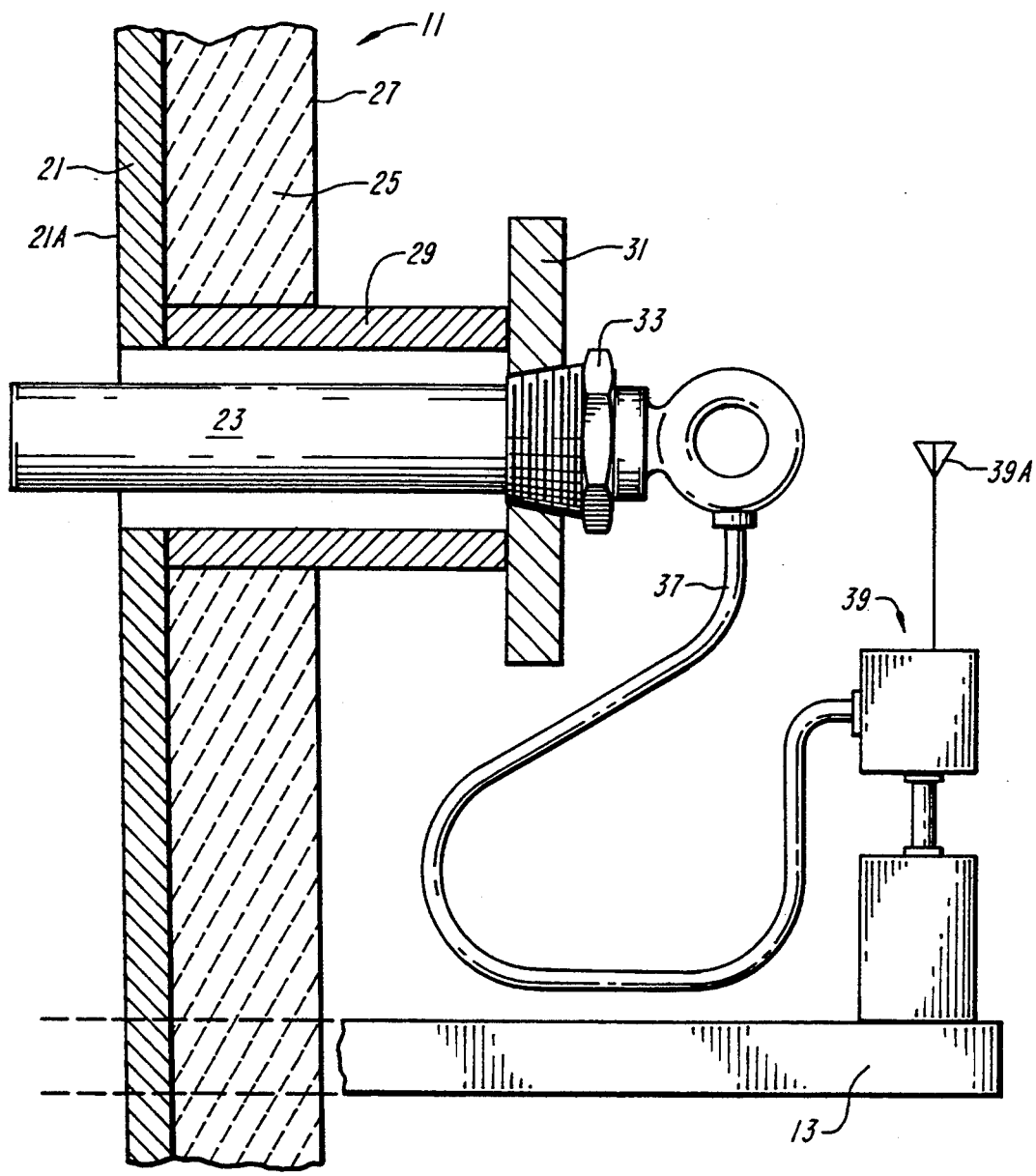
FIG. 3 is a more detailed illustration of a specific sensor mounting for the system of FIG. 1.

In FIG. 3 there is illustrated a typical through-wall installation of an ultrasonic transducer 23 for generating ultrasonic waves that are transmitted across a diameter of the stack, and for directing the propagated ultrasonic waves in a direction normal to the axis of the stack.

In FIG. 3 the sensor/transducer 23 is mounted in a nozzle 29 which penetrates through the wall 21 of stack 11. The wall includes an inner face 21a and, spaced from it, a jacket 27 formed, for example, of aluminum, over an insulating layer 25 to contain the high temperatures of the hot stack gas. Typically the reduction in temperature across the insulating barrier is $>100°$ C. The transducer 23 is mounted through a flange 31 at the outboard end of nozzle 29 and is mechanically mounted through this flange 31 by means of a threaded mechanical connection. As will be illustrated subsequently, particular components may be used to both dampen the sound transmission from the sensor/transducer to the walls of the stack and also to provide a seal to prevent the usually corrosive gases from the interior of the stack reaching the external connections around the transducer, as well as posing a danger to the personnel maintaining the equipment. In the illustrated embodiment a flexible conduit 37 is shown connected to the sensor/transducer to provide energizing signals. The flexible conduit 37 serves to connect the transducer to a power supply and driver control unit 39.

One problem with mounting measurement systems on high stacks is the likelihood of lightning hitting the stack. If the measurement system is electrically connected to a ground level power supply, it provides a conductive path for the lightning, which is apt to result in destruction of the power supply and other connected electronic equipment. Two solutions to this problem are illustrated in FIGS. 1 and 3.

In FIG. 1 the power supply 39, which may be battery operated and if so, rechargeable by solar panels or other source of environmentally available energy is mounted on platform 13. Alternate environmental energy sources include a thermocouple utilizing the approximately 100° C. gradient from the stack to ambient air; stack vibration; ambient noise caused by wind or by the rushing stack gases. As the duty cycle is low, recharging is possible even though each transmission requires a high power pulse. The measurement signal may be transmitted along a cable 9 to a ground level unit for analysis. In order to electrically isolate the ground level circuitry from lightning, a fiber optic link may be inserted to optically convey the signal for some portion of the cable distance without electrical continuity. The transmitter pulse is generated locally, thereby avoiding a power supply conductive link with the ground.

In FIG. 3 a second approach is shown in which a transmitter and antenna 39A is used to transmit measurement information to a remote analysis unit.

Standard gasket isolation kits have been found to provide not only electrical isolation but also isolation from vibrations on the stack wall.

Figure 4:
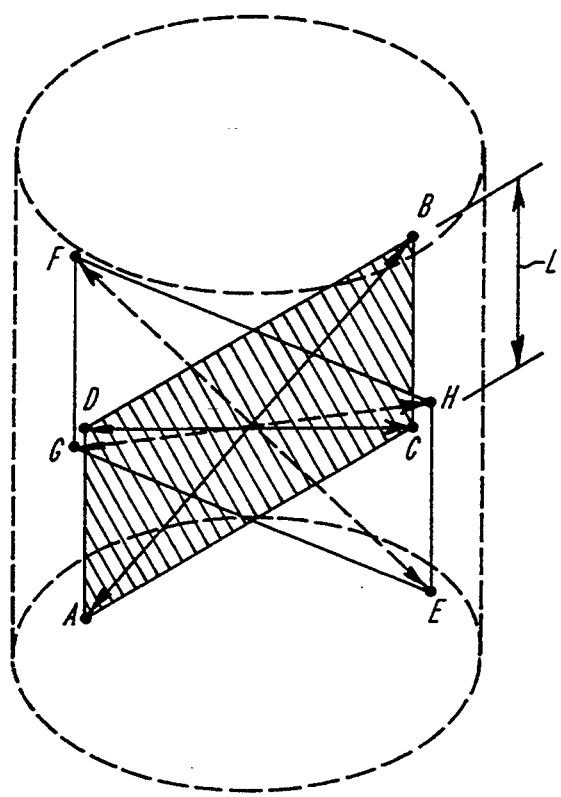
FIG. 4 is a diagrammatic illustration of configurations of sensor positioning in a measurement system constructed in accordance with the principles of this invention.
Figure 5:
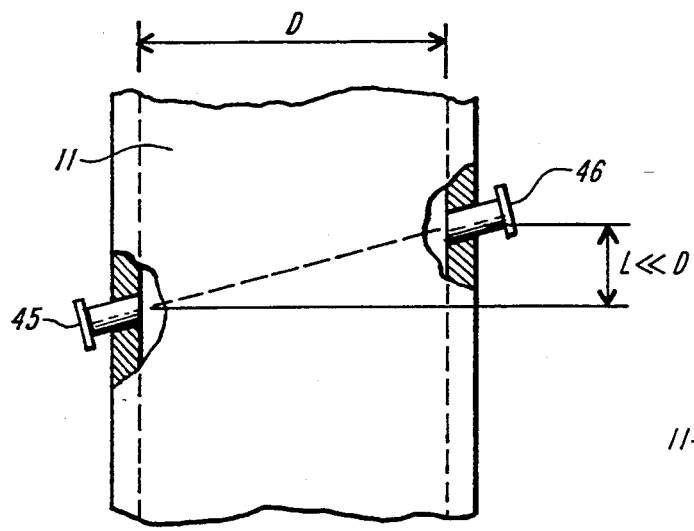
FIG. 5 is a diagrammatic illustration of a configuration of sensor positioning and orientation in a measurement system constructed in accordance with the principles of this invention.
Figure 6:
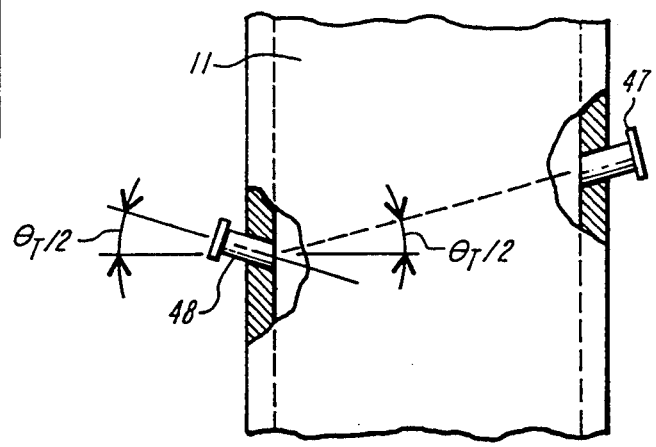
FIG. 6 is an illustration of a configuration of positioning and orientation of sensors in the measurement system of this invention.

In FIG. 4 there is illustrated a crisscross configuration, which employs ultrasonic transducers located at points A,B and C,D, each one of the points being at opposite ends of a tilted diameter. Similarly four ultrasonic transducers can be located on the walls of the stack at points E, F, G, H in a plane normal to the plane of the first four points. Other configurations are illustrated in FIGS. 5 and 6. These crisscross configurations provide for either determination of, or neutralization of, crossflow. Variations of crossflow profiles can introduce error into the measurements, unless they are either determined and are used to correct measurements or, as in the case of the crisscross, balance each other out, thereby neutralizing variations in the crossflow profile.

In the arrangement illustrated in FIG. 4, the paths between transducers are at 45° to the horizontal so that the diameters are vertically angled. In the present invention, the angle of the transducers is typically 15° or less. In the case of 15° the vertical displacement would typically be about 0.25 times the diameter. Thus, for a diameter of 30 ft the vertical displacement, L, would be about 7 ft.

In FIG. 5 a pair of nozzles 45 and 46 pass through the walls of the stack 11 with a slant, downward in the case of nozzle 46 and upward in the case of nozzle 45. Transducers are mounted in each of these nozzles. The separation between the centers of the transducers is, as shown, one in which the vertical displacement L is much, much smaller than the diameter D of the stack.

In FIG. 6 a configuration is illustrated in which both nozzles 47 and 48 are slanted downward as they pass through the wall of the stack 11 in order to drain any condensate that may collect within the nozzle. In such an arrangement the transducer head in nozzle 48 is turned as illustrated through an angle $\theta_t$, where $\theta_t \simeq \tan^{-1}(L/D)$, while the transducer in nozzle 47 is straight. The vertical displacement between the centers of the faces transducers is L.

Figure 7:
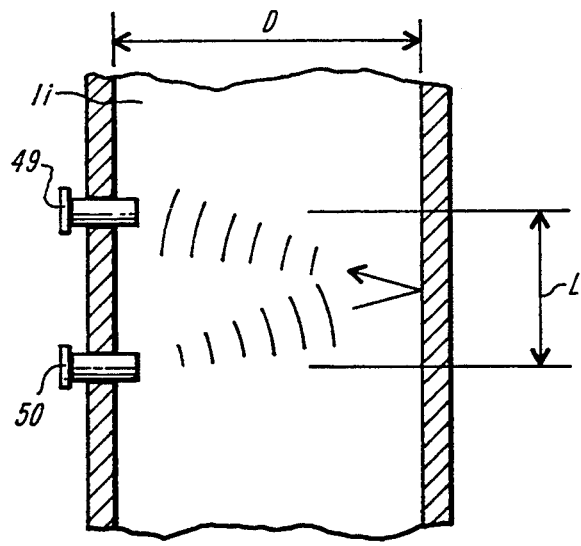
FIG. 7 and FIG. 7A are a diagrammatic illustrations of a configuration of the measurement system of this invention in which the transducers are to be mounted on one wall of a stack.
Figure 7A:
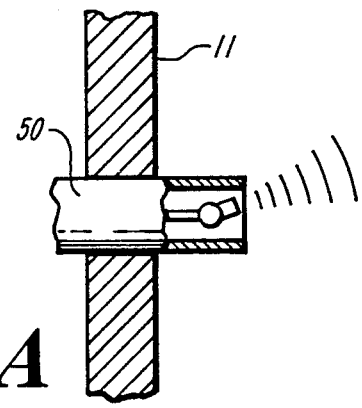

FIG. 7 and FIG. 7A are an illustration of a one sided installation of two nozzles. This arrangement provides a vee interrogation path across the stack 11. This path is initiated at one transducer, reflects off the opposite wall and is returned to the other one of the pair of transducers, each located in one of the nozzles 49 and 50. The transducer head within the nozzle may be turned through an angle, again $\theta_t$, as defined above.

One problem which has been encountered in the past in ultrasonic measurements in stacks, is the accumulation of particulate matter, liquid matter, and other materials on the face of the transducers and in the front portion of the nozzle. Typically this has been dealt with by a constant purge of air, even during the time when measurements are taking place. However, in the present configurations it has been found that successful operation can be attained with only occasional purges, or even no purges.

While the requirements of high temperature, about 175° C., and toxic gases are severe, transducers capable of operating under these conditions have been described. Specifically, suitable transducers are described in U.S. Pat. No. 5,159,838 and U.S. Pat. No. 4,297,607, both of which are incorporated herein by reference. Also transducers with the wetted portions of the transducers, i.e. the exterior portions of their housings made of titanium, Sandvik 253 MA, Hastelloy ™ C276, Carpenter ™ 20, Inconel ™ 600-series or other corrosion-resistant buildup-resistant material appropriate for specific conditions are suitable.

One corrosion-prone failure point is the O-ring seal around each transducer module. Silicone O-rings have the advantage over other O-ring materials, in that they are acoustically isolating. However, at high temperature they can fail in some corrosive gases or liquids. An epoxy alternative seal would be 3M type 2216. An all-metal alternative would be a diaphragm or bellows arrangement, to seal while retaining isolation.

Titanium diboride is another coating that is both abrasion-resistant and corrosion-resistant. Another possibility is to plate nickel and/or gold on the surface, including the O-rings which will be exposed to the corrosive gases.

Some other specific considerations are involved in the transducer subassemblies. The outward rush of hot gas, which may well contain fly ash or other particulates (or acidic droplets) can be dangerous to personnel. It is therefore desirable to introduce some means for minimizing the risk to personnel involved in removing the transducers for visual inspection or performing routine maintenance that avoids or reduces the need for removing the transducers. Such features include (a) self-closing gasket seals; (b) provision for occasional purges; (c) means for quick connecting either a blind flange or perhaps the entire transducer assembly; (d) means for sliding the transducer several inches into the free stream of gas on a temporary basis to self-purge it by the hot stack gas; (e) means for aligning the transducers from outside the stack; and (f) means for physically blocking the nozzle opening as the transducer is being withdrawn.

Figure 8:
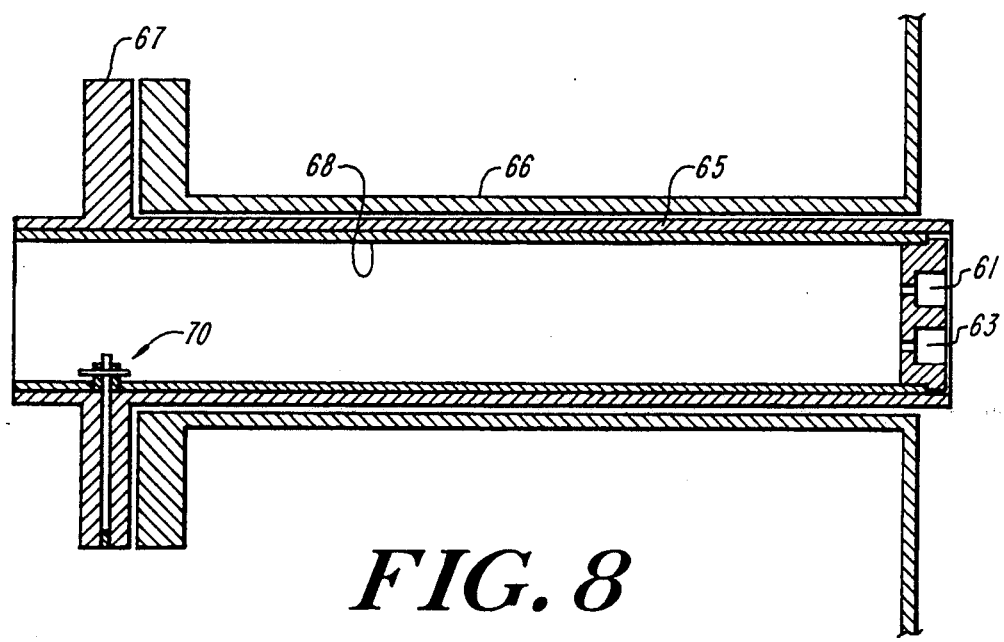
FIG. 8, FIG. 8A and FIG. 8B are illustrations of one mounting arrangement for retaining a transducer within a nozzle in the measurement system of this invention.
Figure 8A:
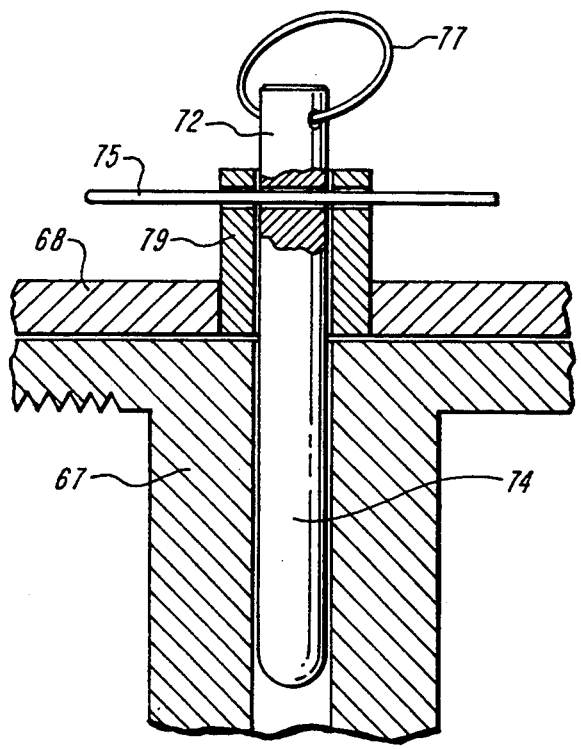
Figure 8B:
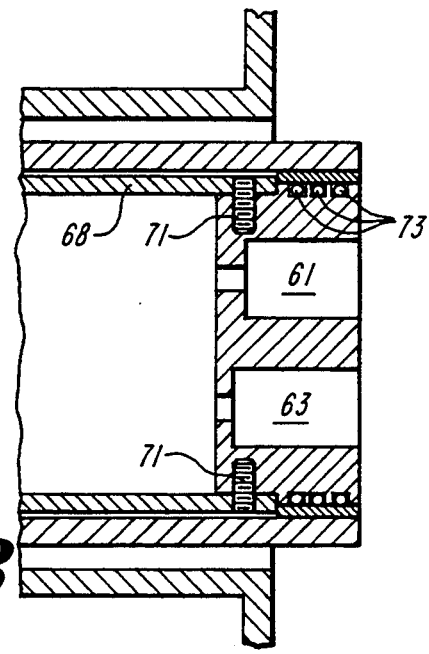

One quick connect apparatus is illustrated in FIGS. 8, 8A and 8B. As illustrated there transducers 61 and 63 are mounted within an outer sleeve 65. The outer sleeve 65 is mounted in nozzle 66, by means of a flange 67 at its outer end. The transducers 61 and 63 are themselves mounted within an inner sleeve 68 to which they are fastened by set screws 71, and sealed with O-rings 73. This inner sleeve 68 is maintained in place by a quick disconnect pin assembly 70 which, as illustrated in FIG. 8A, comprises a pin 72 inserted into a hole 74 drilled in the flange 67. On the outer sleeve 65 the pin 72 passes through a mounting 79, which can be welded or otherwise fashioned onto the inner sleeve 68.

A hitch pin Cotter retainer 75 is mounted in a hole transverse to the direction of the pin 72 through both the mounting 79 and the pin 72. With this hitch pin 75 in place the inner sleeve 68 is fastened to the outer sleeve 65. By removing the hitch pin 75, the pin 72 can be disengaged by means of pull ring 77, thus allowing sliding movement between the inner sleeve 68 and the outer sleeve 65 to withdraw the inner sleeve assembly from the wall of the stack.

Figure 9:
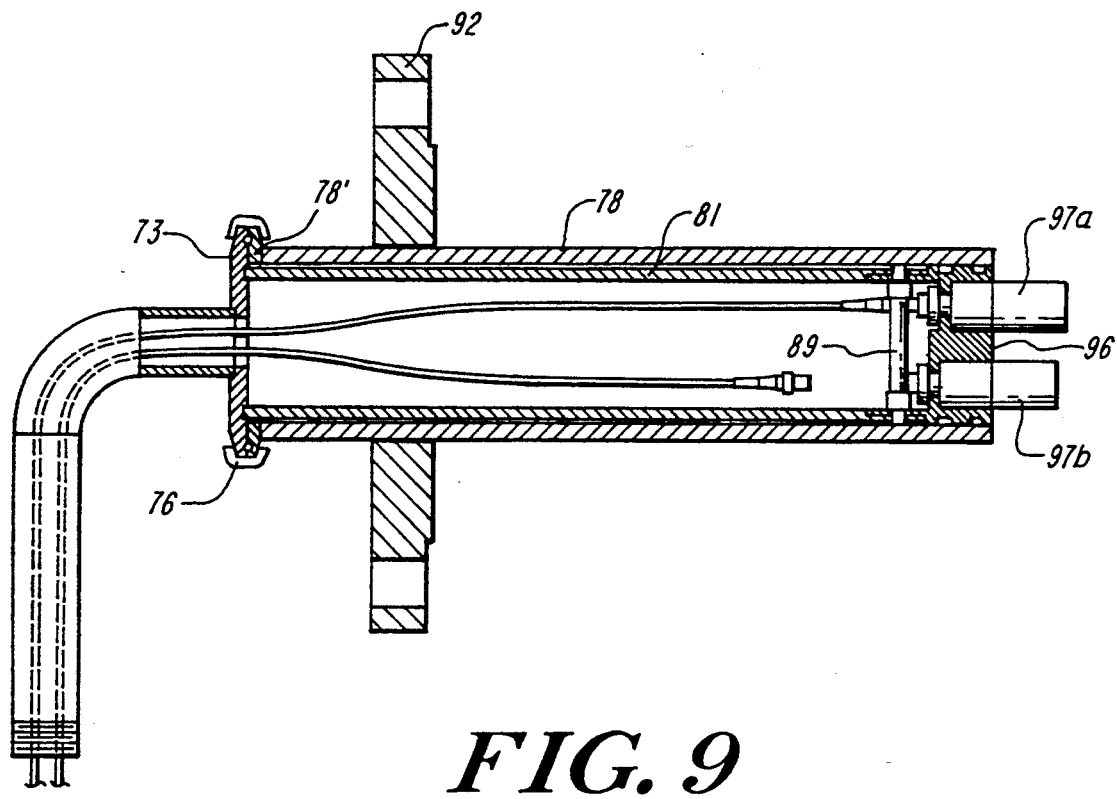
FIG. 9 and FIG. 9A are illustrations of a quick release mounting arrangement for a transducer in the measurement system of this invention.
Figure 9A:
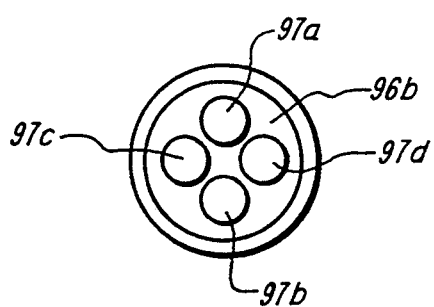

An alternate quick-connect/quick disconnect means includes the use of a clamp as shown in FIG. 9. In the embodiment of FIG. 9, the transducers 97A through 97D are positioned generally in the same configuration as in FIG. 8, within an inner sleeve 81, itself mounted within an outer sleeve 78. While center sleeve 78 is shown as cylindrical, perhaps a preferred geometry would be a tapered sleeve having its larger diameter at the flange 92, to facilitate removal of this assembly if needed. Outer sleeve 78 is fastened, such as by welding, to flange 92 for installing on a stack wall. This embodiment includes two quick release features. One quick release feature is for disassembling the inner sheath from the outer sheath and hence remove it from the stack. The mechanism for accomplishing this includes the clamping of the inner sleeve flange 73 to an outer sleeve lip 78' by means of quick disconnect clamp 76. Clamp 76 can, for example, be a hinged stainless steel sanitary clamp. The second quick release feature provides for quick release of the transducer support manifold 96 from inner sleeve 81. This manifold 96 is locked in place within sleeve 81 by means of a spring pin 89. When the inner sleeve 81 is withdrawn from outer sleeve 78, the spring pin 89 can be depressed, allowing the manifold 96 to be separated from sleeve 81.

In FIG. 10, FIG. 10A and FIG. 10B there is illustrated a complete transducer subassembly for mounting in a nozzle in the wall of stack 11. The assembly includes a flange 92, to which is mounted a cylindrical electrical shield 93 by welds or other conventional means. An annular gasket formed of a suitable resilient polymer such as silicone rubber is placed inside the shoulder of electrical shield 93 to seat against the reducing coupling 95 (or manifold 96 in an alternate embodiment). The transducers 97A, 97B, 97C, and 97D, positioned as illustrated in FIG. 10A, are mounted in a manifold 96, which is shown in more detail in FIG. 10B. The manifold 96 is itself mounted in a reducing coupling 95, the other end of which is fitted within the electrical shield 93.

The manifold, coupling and electrical shield are all formed of suitable metals (for example, Hastelloy ™

C275 or stainless steel 304 or 316) selected to withstand the high temperatures on the inside of the stack 11. As earlier mentioned the transducers themselves, are high temperature resistant transducers as generally described in the referenced patents. A pipe 104 is threaded into the outboard end of the coupling 95. Cables 98 connect each of the transducers back to appropriate circuitry 116, such as model CEM68 identified previously. An outboard coupling 100 is attached to the outer surface of flange 92, again through welds or other conventional means. A set screw collar 99 is seated against O-ring seals 99A and is attached via screws to the outer surface of the flange 92. A set screw 117 passes through outboard coupler 100 and into the set screw collar 99 to prevent further movement of the pipe 104 with respect to the coupling 100, once it has been positioned in place. A centering cradle 102 is mounted inside of coupling 100 at that coupling's outboard end and is capped at its further end by a pipe cap 103 through which the pipe 104 passes. A series of phenolic or other acoustically attenuating washers 106, 106', 107 and 107' are fastened to the flange 92 at at least two different positions around its circumference, by means of bolts 105 and 106 and nuts 108 and 108'. The inner washers 107 and 107' are hard fiber washers and facilitate mounting to the stack wall with some damping or interruption of any acoustic energy to the wall. The second bolt 106 has a similar set of washers for the same purpose. Each of bolts 105 and 106 have a resilient polymer (e.g. teflon) bolt sleeve 94 (or silicone O-ring) surrounding it as it passes through the flange to further acoustically isolate it from the flange. The details of this arrangement are further illustrated in the detailed view of FIG. 10B.

Figure 11:
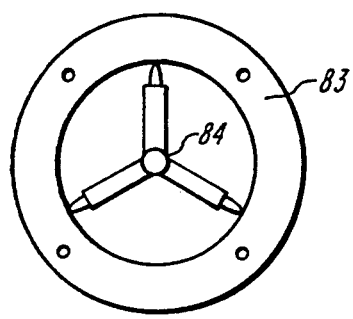
FIG. 11, FIG. 11A and FIG. 12 are diagrams illustrative of apparatus for employing lasers for alignment of transducers to be used with an apparatus of this invention.
Figure 11A:
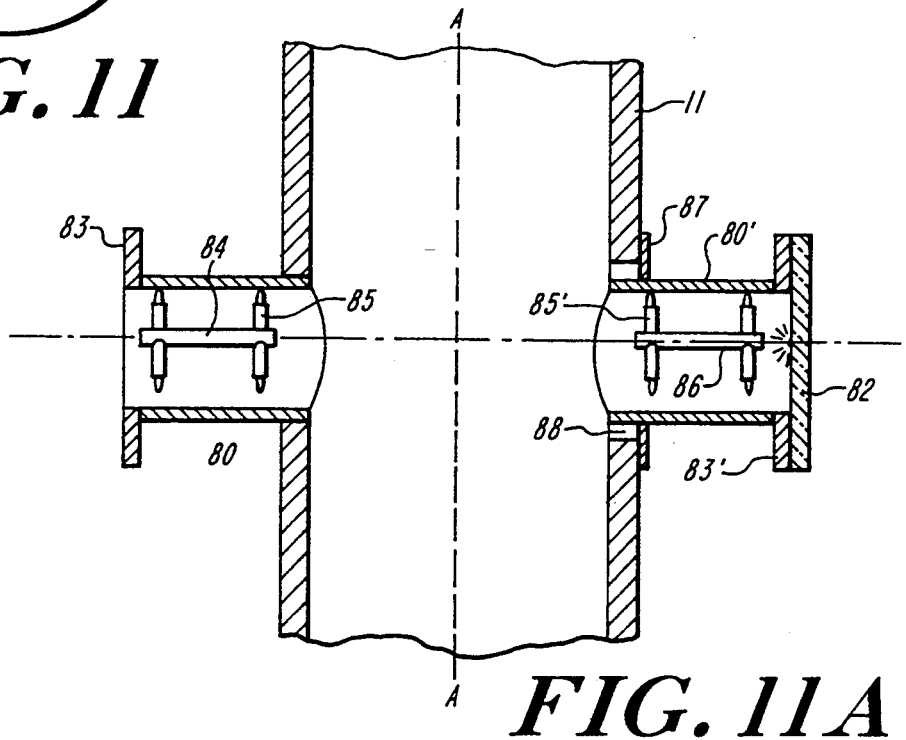

In FIG. 11 there is illustrated a laser alignment system for aligning the transducer subassembly to control the direction of the central axis of the emitted ultrasonic waves. As illustrated in FIG. 11 and FIG. 11A, a stack 11 has a pair of nozzles 80 and 80' which are intended to house ultrasonic wave emitting subassemblies. The nozzles enter the stack 11 at a substantially right angle to the vertical axis A—A of the stack. In nozzle 80 a conventional laser pointer device 84 is mounted by means of six spring-loaded centralizer supports 85, configured with three at the inboard end, and three at the outboard end as shown in FIG. 11A. The beam of the laser pointer 84 is directed across the diameter of the stack 11. In the diametrically opposite nozzle 80' an optical collimator 86 is mounted along the axis of propagation of the laser beam, and is supported by the same arrangement of centralizer supports 85' as are used to support the laser in the opposite nozzle. A frosted glass or clear plastic plate 82 is mounted to the flange 83' of nozzle 80' so that the laser beam may properly be aligned by means of locating the nozzle 80' in an oversized opening 88 in the stack wall. Once lined up the nozzle 80' is fixed at a specific position in the opening 88 by means of attaching an oversized saddle member 87 which is attached to nozzle 80' to the wall of the stack 11.

Figure 12:
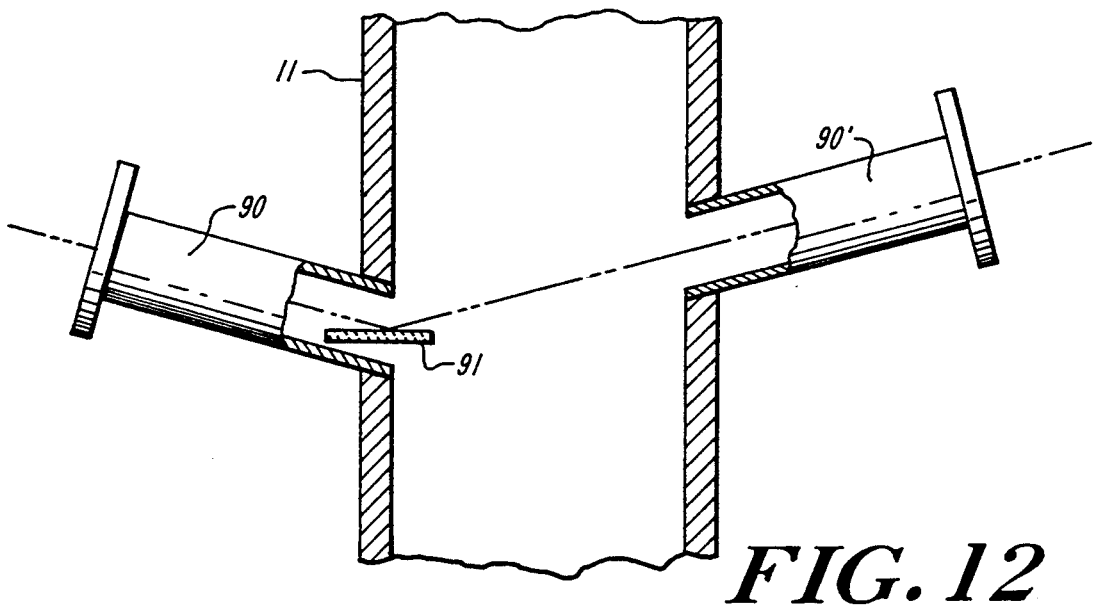

Another laser alignment arrangement is shown generally in FIG. 12, where the nozzles 90 and 90' are inserted in the stack wall 11 at an angle. In this arrangement, however, since there is not a straight alignment between the center axes of the nozzles, a mirror 91 is placed in the nozzle 90 at a position to intercept, at approximately the center point of the opening of the nozzle, an incoming laser beam and is angled to reflect that laser beam back along the central axis of the nozzle 90.

Another feature of this invention includes apparatus for accurate measure of the sound speed within the gas.

It is well known that the measurement of sound speed c across the stack yields information on either temperature or composition (molecular weight divided by a specific heat ratio, $M_w/Y$), or some combination of the two. By making certain assumptions about composition of the gas in the stack an average temperature can be computed over the acoustic path, or conversely, if an average molecular weight, e.g. 29 is assumed for the dry portion of the gas, the moisture content can be computed from sound speed c, taken together with a thermocouple measurement of the temperature T. In order to accomplish this, measurement of the temperature T by thermocouple or other non-acoustic method is carried out in the hot stack gas near where a local short path measurement of the sound speed c is simultaneously being made. With this information the average stack gas temperature over the other diametric long acoustic paths can be inferred according to the equation, $$T_{\text{longpath}}/T_{\text{short path}} = (c \text{ long path}/c \text{ short path})^2 \quad (8)$$

No assumption is made about the composition of the gas, other than that the average composition is substantially the same in a local short path region as it is in the longer path region. This is a reasonable assumption in stacks where the turbulence is so great as to mix the gases and mix the temperature also, with the exception of the volume right next to the stack walls. Next to the stack walls there is a thermal boundary layer, and, as a result, moisture may not be in the same concentration there as in the center of the stack. Because of this boundary layer, measurements of the sound velocity c and temperature T should not be made there but rather out away from the wall, preferably 10 to 30 cm away.

However, in cases where conditions are relatively stable and where relative accuracy suffices, a short-path measurement of c can be made in the gap between two transducers such as 97a, and 97c in FIG. 10. In this transducer configuration, under at least some flow circumstances, an echo may be received from a remote reflector such as the opposite wall, or some other reference reflector as may be used during no-flow transducer assembly and checkout. Also, the piezoelectric elements often used to fabricate the transducer modules as used in CEM applications typically vibrate in the radial mode. This means that in addition to the forward radiation pattern, there is also a sideward radiation pattern, which may be employed to sense sound velocity in the gas in the gap between 97A and 97C.

It will be understood that in order to measure c over a short path between nearby transducers installed and sealed within a common acoustically-conductive manifold such as a body of stainless steel, it is necessary that the transducers be acoustically isolated from one another. The isolation means employed in FIG. 10 is similar to that in FIG. 1, namely, using silicone durometer 70 O-rings having but limited area of contact with the elements being sealed.

Figure 13:
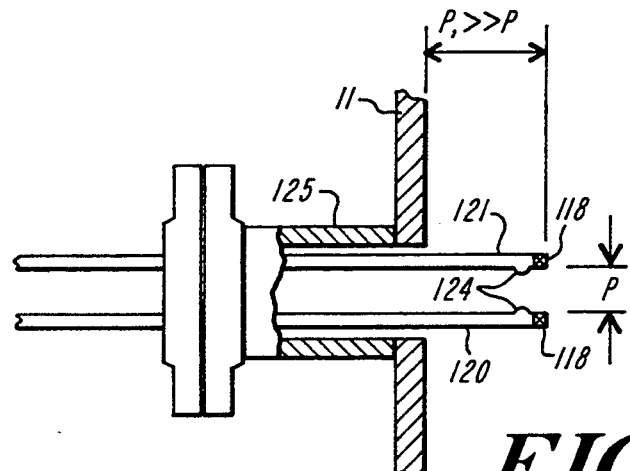
FIG. 13, FIG. 14, FIG. 15, FIG. 15A, FIG. 16 FIG. 16A and FIG. 16B are specific configurations of elements of transducer arrangements for making short path measurements in an apparatus of this invention.
Figure 14:
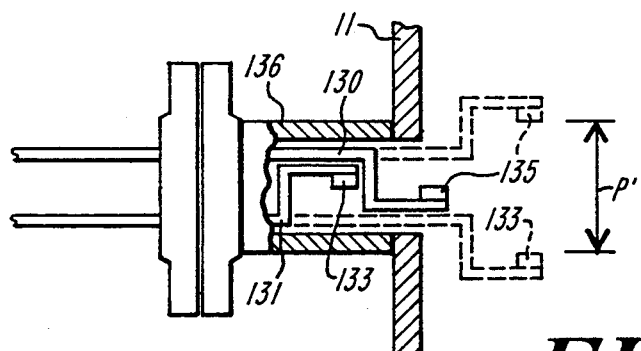

In FIGS. 13 and 14 there are illustrated configurations of probes suitable for measuring the acoustic velocity c over a short path P. In FIG. 13 a pair of narrow small diameter tubes 120 and 121 extend through the flange at the outboard end of nozzle 125, each carrying a transducer 118 at its inboard end facing each other, separated by a distance P. The short path measurement of the acoustic sound velocity can thus be made by measuring the acoustic transmission from one of these transducers to the other.

These hollow tubes 120 and 121 may also include an opening 124 where air or an inert gas may be used to purge the volume immediately around the transducers, either on a predetermined schedule or as needed. Of course, the gas for the purging is supplied through the hollow tubes from outside the stack. A temperature sensor not shown, such as a thermocouple may be mounted within either or both of the tubes 120 and 121 to determine the temperature at the local area of the short path acoustic measurement.

FIG. 14 is a similar arrangement except that the probes 130 and 131 are formed with a right angle bend, followed by another straight portion carrying each of the transducers 133 and 135. The probes are arranged to be rotated so that when the short path acoustic measurement is not being made they are withdrawn within the nozzle 136 and, when the measurement is to be made, they are extended, as indicated by the dotted lines into the stack volume, perhaps 10 or 20 cm, and rotated so that the transducers are actually spaced apart by a distance P' which is greater than the internal diameter of the nozzle 136.

It should be noted that in the configurations of both FIGS. 13 and 14, the probes are adjustable along their axes so that for measurements they can be inserted into the stack volume beyond the thermal boundary layer and, when not being used for measurement, can be withdrawn within the nozzles. They can, however, be fixed at a particular depth of insertion into the stack, e.g. 20 cm.

Figure 15:
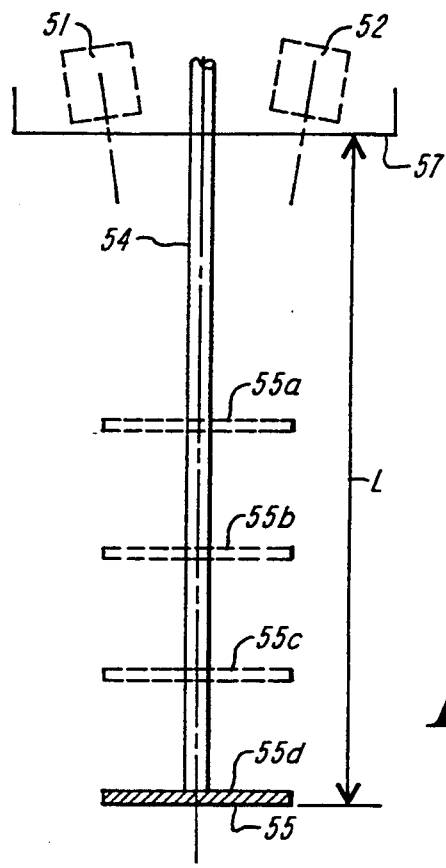
Figure 16:
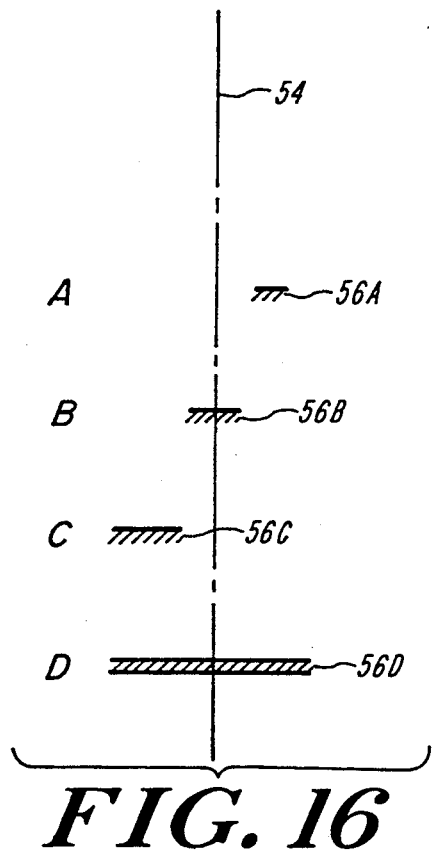

FIGS. 15 and 16 illustrate alternate embodiments of an ultrasonic system for measuring sound velocity and gas flow over short measurement paths.

Figure 15A:
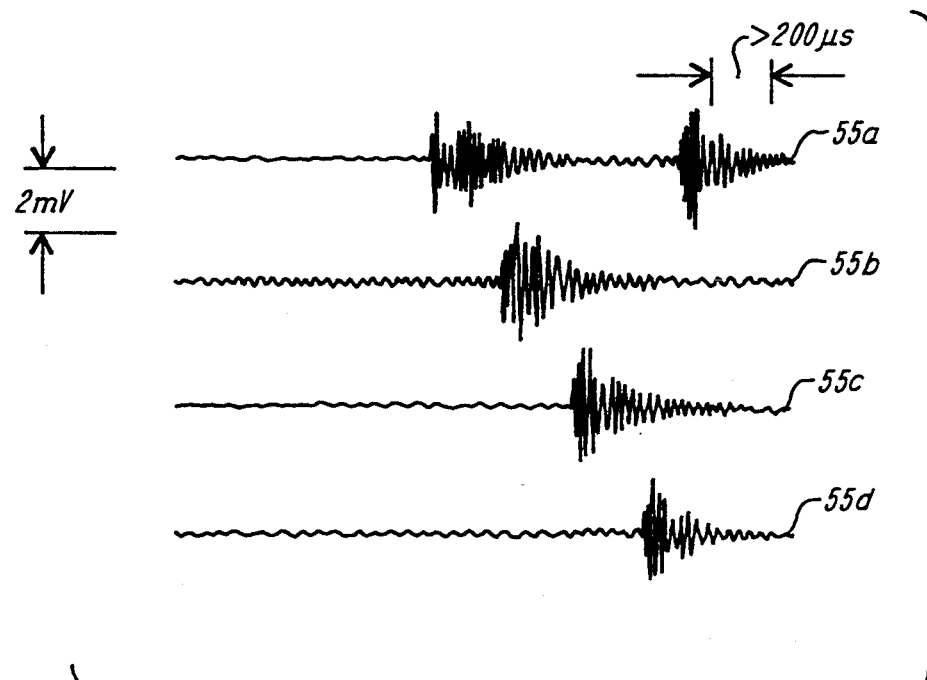

In FIG. 15 a stainless steel disk 55 is attached to the end of a narrow bore tube 54 which is inserted from a transducer manifold 57 such that the tube may be moved along its axis to selectively position disk 55 as indicated in phantom. Transducers 51 and 52 are mounted in flange 57 at an inwardly tilted angles. The transducers are mounted with acoustic isolation and the energization of the transducers is sequenced so that the ultrasonic burst from one transducer is reflected from disk 55 back to the other transducer, thereby providing a measure of acoustic velocity c over the series of paths created by the series of disk positions as shown. The time based waveforms of the acoustic pulses sensed by the transducer for the indicated positions of the disk 55 are shown in FIG. 15A.

Figure 16A:
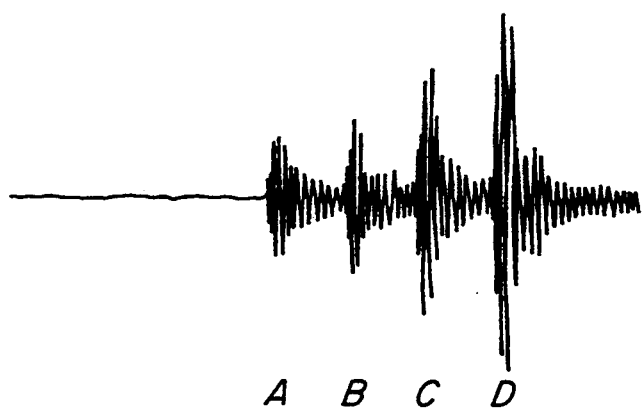
Figure 16B:
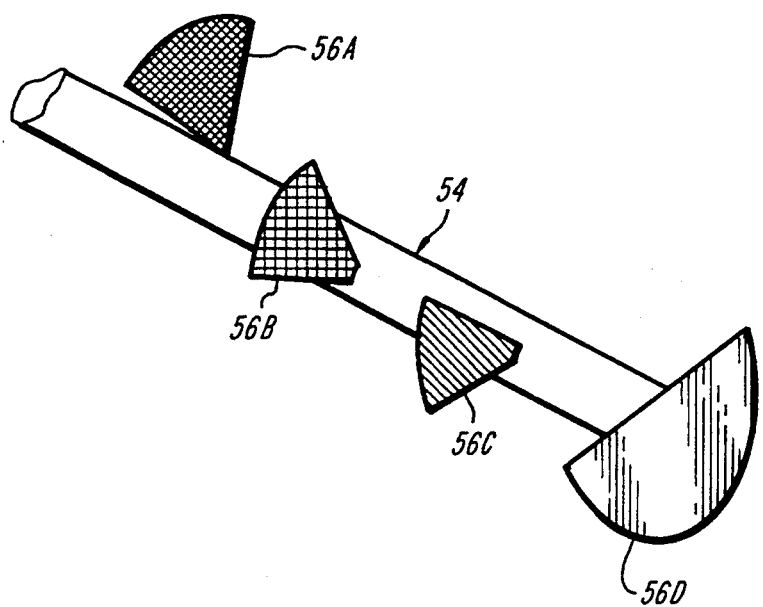

In the embodiment of FIG. 16A and FIG. 16B the transducers are positioned as in FIG. 15. However, rather than a movable disk, disk segments 56A through 56D are mounted on support 54 at spaced positions to provide a series of reflectors for each burst of ultrasonic waves from the emitting transducer, providing the waveforms illustrated in FIG. 16A. If the transducers 52 and 51 are mounted with the illustrated displacement L being vertical and if the transducers alternatively serve as emitter and receiver then the vertical gas flow can be measured for the different radial positions of the reflectors. Such an arrangement can be used to determine the spacing from the wall of the stack at which the vertical gas flow becomes substantially uniform in the horizontal plane. Such a determination can be employed to determine a measuring position along a diameter at which wall effects are reduced or negligible.

Typically the spacing between flange 57 and disk position 55D in FIG. 15 is 16 inches. However a similar movable reflector configuration with vertically displaced transducers can be employed with the radial positions of the disk 55 being spaced across the diameter of the stack, thereby providing a profile of gas flow velocity as a function of radial position in a horizontal plane. Such an arrangement could be used to map the gas velocity profile in a horizontal plane to provide the periodic calibrations in a horizontal plane as required by the environmental laws.

Another consideration involved in the use of ultrasonic transducers in gas flow measurement is beam spread diffraction loss. The beam spread diffraction loss from an ultrasonic transducer mounted in a nozzle is $d_{LOSS}=[4+6 \log_2(P\lambda/d^2)]$dB where P=(gas) path length, $\lambda$=wavelength and d=diameter of the aperture, e.g., transducer diameter $d_x$ or nozzle diameter $d_n$. This means, for a given P and $\lambda$, $d_{LOSS}$ decreases 12 dB per doubling of d. Since the directivity of both transmitting and receiving transducer are involved, the effect is 24 dB if the geometry is the same at both ends of the path. Accordingly, increasing d decreases $d_{LOSS}$. Doing so, however, narrows the beam, since the included angle between −3 dB points is $\theta_3$ dB $\cong\lambda/d$. At Mach numbers of 0.1, too narrow a beam angle means the beam would be swept away from the receiver at which it is aimed at zero or low flow velocities. Sweeping the beam during measurement overcomes this problem. This can be accomplished by means of chirping an array of transducer modules within a manifold similar to that of FIG. 10, so that pulse compression techniques can be used and also transducers whose bandwidth may be inadequate for PN (pseudo-random noise) coding may be utilized. Such a transducer array is illustrated in FIGS. 17A, 17B and 17C.

Figure 17:
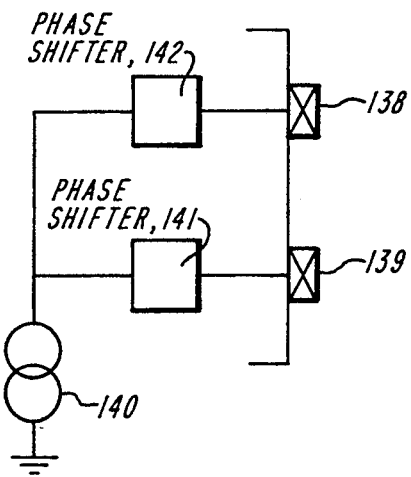
FIG. 17 is an illustration of a technique for sweeping a beam of a narrow aperture transducer for use in an apparatus of this invention.

In FIG. 17 a system is shown for using a chirping circuit to provide for steering of the ultrasonic beam without tilting the transducers.

Figure 17A:
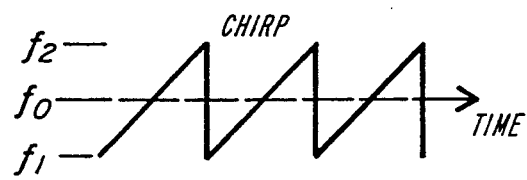

FIG. 17A is a block diagram in which two co-planar transducers 138 and 139 are driven by individual phase shifter circuits 141 and 142 respectively from a chirping circuit 140. The phase shifters are arranged so that they have differing phase versus frequency functions.

Figure 17B:
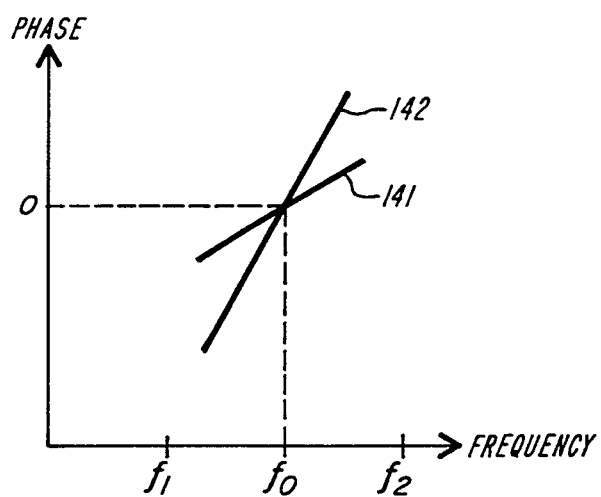
Figure 17C:
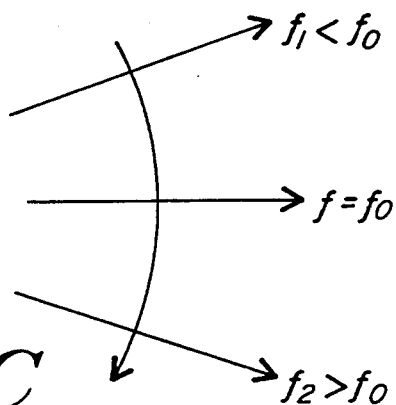

FIG. 17B is a diagrammatic illustration of phase versus frequency characteristics for the two-phase shift circuits 141 and 142. On the horizontal coordinate the frequency scale is shown as $f_1$, $f_0$ and $f_2$. Typical values of $f_1$ and $f_2$ are about 45 kHz and 55 kHz, respectively. As illustrated in FIG. 17A a chirping generator is shown which provides essentially a saw-tooth wave which varies in frequency from $f_1$ through $f_0$ to $f_2$. With the chirp generator 140 producing an output as shown in FIG. 17A the phase difference of the emitted ultrasonic waves from the transducers 138 and 139 will differ.

FIG. 17 is an illustration with arrows indicating the direction of propagation of the composite wave from the two transducers 138 and 139. When the frequency from the chirp frequency generator is equal to $f_0$ then the axis of propagation of the composite wave is normal to the face of the transducers. When the frequency is less then $f_0$ the axis of propagation is tilted in one direction away from the normal, and when the frequency is greater than $f_0$ it is tilted in the other direction away from normal.

While only two transducers have been illustrated, it will be understood that a series of transducers, for example, 4, 6 or 8 may be employed to achieve a more controlled steering effect. Since this arrangement allows for change in direction of the propagation of the ultrasonic wave beam without tilting the transducer, it avoids problems of unequal build up of particulate matter etc. on the transducer faces.

Figure 18:
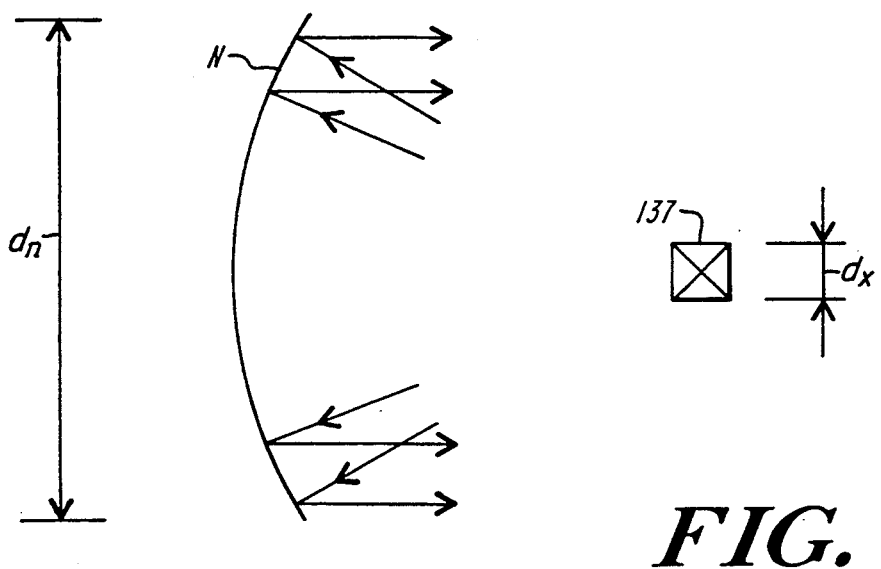
FIG. 18 is an illustration of a narrow aperture beam for use in the measurement system of this invention.

This transducer arrangement can also be used in an antenna feed arrangement so that the aperture of a small transducer (small $d_\lambda$) can in effect be increased by reflection from antenna N. Such a configuration is illustrated in FIG. 18. The transducer 137 is shown at the focus as having an aperture $d_X$ arranged, as indicated, to feed the ultrasonic beam over a distance $d_n$, which becomes the effective aperture of the curved reflector, which may preferably be spherical, parabolic or cylindrically curved.

A difficulty associated with stack measurements is that the stacks tend to vibrate, since they are thin walled (often only 1 or 2 cm thick) and subject to high velocity gas flow. This vibration can introduce several mm, perhaps nearly ±1 cm variation in the length of the acoustic paths. This can be dealt with by averaging a number of readings. However, it is necessary to avoid an ultrasonic propagation pulse repetition frequency that is harmonically, or nearly harmonically, related to the oscillation frequency of the stack. One way to avoid this latter effect is to monitor the vibration of the stack wall using, for example, an ultrasonic transducer or an independent accelerometer. The initiation of the pulses is then arranged to take place at a time that is consistently related to the stack wall oscillation, for example, always initiate when the path across the stack is either at a maximum or at a minimum, or when one of the walls is at an extreme. Another approach is to initiate the ultrasonic pulse at random delays following zero or peak acceleration of the stack wall oscillation. Still a further refinement is to employ a constant emission monitor (CEM) transducer as the vibration monitoring device and subtract the vibration-induced noise from the received signal generated at the flow meter receiver. Under this arrangement the monitoring transducer for the wall vibration would have to be located physically close to the flow receiver so that amplitude and phasing of the vibratory noise would be common to both.

Figure 19:
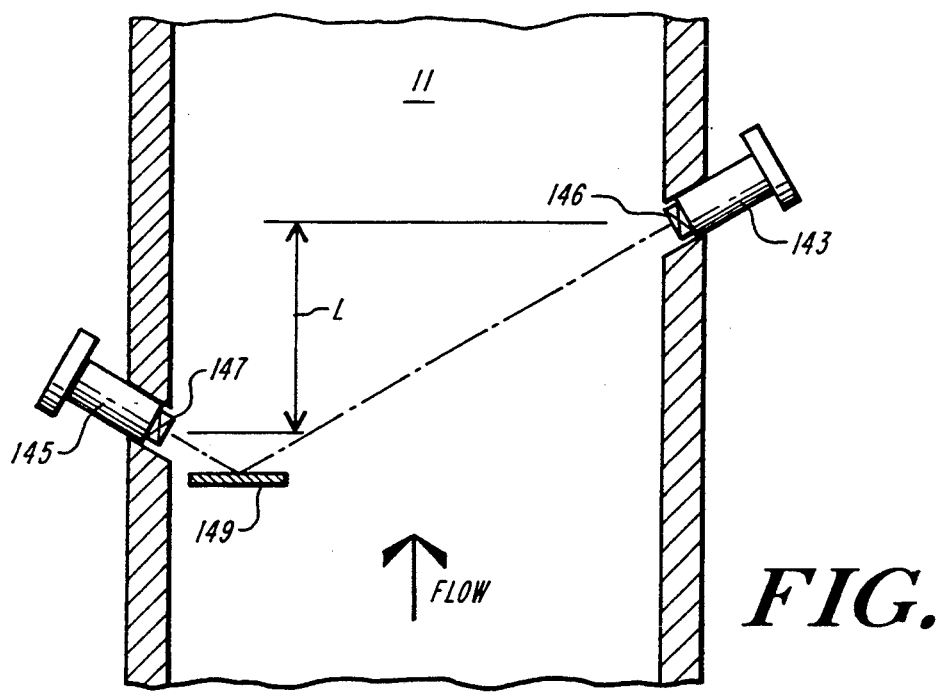
FIG. 19 is a illustration of a transducer system employing an internal reflector for use in the measurement system of this invention.

FIG. 19 illustrates a transducer positioning configuration in which symmetry is achieved at both nozzles 143 and 145 while achieving a short L measuring path. Each of the nozzles are angled down, but the transducers 146 and 147 are not rotated within the ports. Rotation of one of the transducers, can result in a symmetry due to unequal residue buildup on one transducer versus the other. In the present instance the transducers are positioned to emit ultrasonic waves along a central axis aligned with the axes of the nozzles. A reflector 149 is mounted below the transducers to reflect waves from each transducer onto the other. Since that portion of the sound path below transducer 147 has equal downward and upward path sections, these tend to cancel out in terms of the stack vertical flow velocity effect, so that the effective measurement path length is L.

In the configurations illustrated in all of the preceding figures the transducers have been through wall mounted so that the transducer is directly interfaced with the gas.

However, clamp-on transducers could also be employed in which the transducer is clamped to the outside wall of the stack and the ultrasonic waves are propagated through the wall across the diameter to a second clamp-on transducer. The structure of individual clamp-on transducers is well known in the art.

The clamp-on transducers can introduce energy normal to the wall of the stack and, if their aperture d is small enough, then slightly oblique contrapropagation is possible upstream and downstream, diagonally.

In stacks of large diameter, $D \geq 3m$, the transit time around the semicircumferential path is $\pi D/2C_p$ where $C_p$ is the speed of plate waves. There is no single value for $C_p$ as $C_p$ depends on frequency f, plate thickness w, plate material (typically steel) and vibration mode (longitudinal, shear, symmetrical or asymmetrical Lamb wave). Some values of $C_p$ can be less than the speed of sound in the stack gas. It has been observed, however, that at the time of arrival of gasborne ultrasonic waves, the plate-borne acoustic waves are generally weaker than the gasborne waves, if the gasborne waves are introduced through nozzles that allow for a high degree of acoustic isolation.

If one or both of the transducers are not isolated acoustically from the plate, the situation changes, and the plate waves of strength $I_p$ can be comparable to or even stronger than the gasborne waves of strength or intensity $I_g$. If the plate waves arrived always at the same time and of constant intensity, their contribution $I_p$ could be subtracted from the resultant wave $I_r = I_p + I_g$, leaving $I_g$. But when $I_p$ varies, e.g., as a function of residue on the stack wall or as a function of stack wall temperature, a more general solution is required. One such general solution involves occasionally and briefly interrupting the gasborne signal by means of a mechanical or other scatterer in the gas path.

Figure 20:
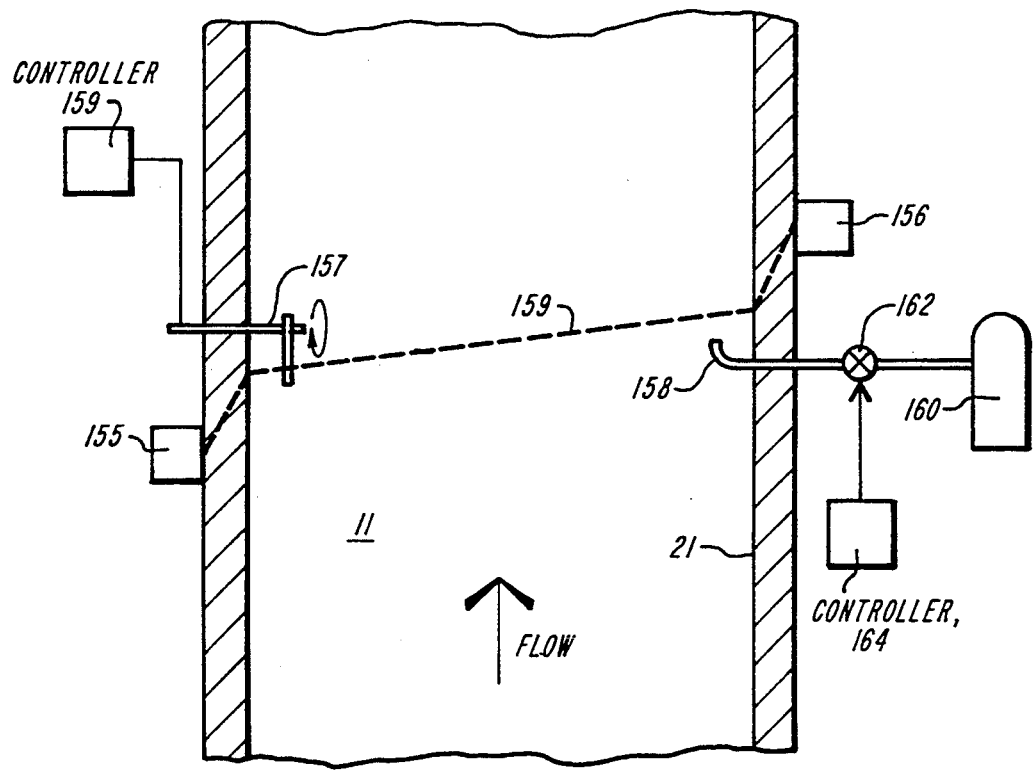
FIG. 20 is an illustration of a measurement system constructed in accordance with the principles of this invention employing clamp-on transducers.

FIG. 20 illustrates a system employing conventional ultrasonic clamp-on transducers 155 and 156 generating ultrasonic waves across path 159 to measure flow velocity. As is usual the transducers are sequenced to act sequentially as transmitters and receivers. In one embodiment interruption is achieved by a rotating vane 157 that is normally not in the path, analogous to a chopper used in optical systems. The obstacle can also be a jet of compressed air or steam 158 that is squirted in the gas path, suddenly changing the gas density and index and thereby deflecting and attenuating the gasborne wave. Interruption by 0.1 seconds suffices once every 15 minutes, for example. If it is observed that $I_p$ does not change significantly between such 15-minutes-apart events then the interruption frequency can be reduced to 0.1s per hour, per day, per week, etc. The criterion for significant change in $I_p$ is $$I_{p(n+1)} - I_{p(n)} < I_g/3.$$

What has been described are a number of physical systems to be employed in monitoring the flow of stack gases. The signals produced from these transducers can be correlated either by electronic circuits, microprocessors or computers in order to correct the ultimate volumetric gas flow values for variations such as the temperature, humidity, and crossflow.

While many of the illustrated embodiments have shown one pair of transducers positioned on diametrically opposed walls of a stack, it will be realized that multiple pairs of transducers may be employed on different diameters, and often using the crisscross configurations shown in FIG. 4.

Having described specific embodiments it will be understood that the scope of the disclosed invention is defined by the claims.

What is claimed is:

1. An apparatus for monitoring volumetric flow rate of gases through a hollow stack having an extended vertical axis wherein the diameter of said stack is greater than about three meters comprising, ultrasonic transducer means for emitting an ultrasonic beam from a specified vertical position on said stack wall vertically displaced from the bottom of said stack, said ultrasonic beam being emitted with a substantial conical envelope on a central axis of propagation normal to said vertical axis along a diameter of said stack, and for receiving said ultrasonic beam at a vertical position displaced vertically from said specified vertical position by a distance which lies between zero and a fraction of said diameter, not to exceed about two meters, the half angle $\theta_h$ of said emitted beam envelope being such that during volumetric flow a detectable portion of said emitted ultrasonic beam is received, and means operative during said volumetric flow for exciting said ultrasonic transducer means in controlled sequence, and for providing as indicative of said volumetric flow rate an output signal indicative of a transit time from the time said ultrasonic beam is emitted from said ultrasonic transducer means until it is received by said ultrasonic transducer means.

2. An apparatus for monitoring volumetric flow rate of gas flowing through a hollow stack having an extended vertical axis wherein the diameter of said stack is greater than about three meters comprising, a first ultrasonic transducer positioned on said stack wall to emit ultrasonic waves directed on a central axis of propagation along a diameter of said stack in a horizontal plane, normal to said vertical axis, and vertically displaced from the bottom of said stack, a second ultrasonic transducer positioned to receive said ultrasonic waves emitted from said first transducer, said second ultrasonic transducer being displaced vertically from said first transducer by a distance L which is no more than a fraction of said diameter, not exceeding about two meters, the half angle $\theta_h$ of said first ultrasonic transducer emission being such that a detectable portion of ultrasonic waves from said beam emitted by said first ultrasonic transducer directly impinges upon said second ultrasonic transducer, and means for exciting said first ultrasonic transducer in a controlled time sequence, and for providing an output signal indicative of a transit time of ultrasonic waves from said first ultrasonic transducer received by said second ultrasonic transducer.

3. An apparatus in accordance with claim 2 wherein said second ultrasonic transducer is positioned at the opposite end of a tilted stack diameter from said first ultrasonic transducer.

4. Apparatus in accordance with claim 3 having nozzles extending through said stack wall, each of said ultrasonic transducers being mounted in a corresponding one of said nozzles, and wherein said half angle $\theta_h$ is approximately equal to the Mach number of said gas flowing vertically through said stack.

5. Apparatus in accordance with claim 4 wherein said nozzles are mounted to support said first and second ultrasonic transducers such that said transducers emit a beam of ultrasonic waves along an axis substantially normal to said stack vertical axis.

6. Apparatus in accordance with claim 4 wherein said nozzles are generally cylindrical in shape with the long axis of said nozzles generally normal to said stack vertical axis and wherein both said first and second transducers each emit a beam of ultrasonic waves and detect ultrasonic waves incident upon them, and wherein said means for exciting said first ultrasonic transducer also excites said second ultrasonic transducer in a controlled sequence, said first ultrasonic transducer being mounted within one of said nozzles to direct said emitted ultrasonic beam at an angle of less than about 15° inclination toward said second ultrasonic transducer and, said second ultrasonic transducer being mounted within the other of said nozzles to direct said ultrasonic beam at an angle of less than about 15° vertical inclination from the horizontal toward said first ultrasonic transducer.

7. Apparatus in accordance with claim 4 and further including a subassembly for mounting within one of said nozzles to hold one of said ultrasonic transducers, said subassembly comprising an outer sleeve carrying a flange fixed to said nozzle, and tapered outwardly toward said flange, an inner sleeve having a flange fixed to it and, quick disconnect clamp means for holding said outer sleeve flange and said inner sleeve flange together thereby holding said subassembly within said nozzle.

8. Apparatus in accordance with claim 7 wherein said ultrasonic transducer element is fastened within said inner sleeve by a quick disconnect pin.

9. Apparatus in accordance with claim 4 and further including a subassembly, for mounting within one of said nozzles in place of one of said ultrasonic transducers, said subassembly comprising, first and second probe tubes extendable from said nozzle in a direction generally normal to said vertical axis and retractable within said nozzle, first and second probe ultrasonic transducers, each mounted on the end of one of said probe tubes away from said nozzle in facing relationship with one another and defining a path P between said two probe ultrasonic transducer faces, and means for exciting one of said probe ultrasonic transducers to generating ultrasonic waves to be propagated toward the other of said probe transducers to measure the acoustic characteristics over said path P through said gas.

10. Apparatus in accordance with claim 9 wherein at least one of said probe tubes includes a temperature sensor.

11. Apparatus in accordance with claim 9 wherein said probe tubes include an offset section and are individually rotatable, such that in one rotational position the tubes have a total radial separation less than the diameter of said nozzle and in another rotational position said probe transducers are separated by a distance P larger than said nozzle diameter.

12. Apparatus in accordance with claim 4 including an ultrasonic transducer subassembly mounted within one of said nozzles, said ultrasonic transducer subassembly comprised of at least two individual ultrasonic transducers, a series of reflector elements mounted on a support tube extending inwardly from said stack wall for a distance which is only a fraction of said stack diameter, said series of reflector elements being vertically positioned to interrupt ultrasonic waves emitted from one of said subassembly individual ultrasonic transducers and reflect them back to the other of said subassembly individual transducers, each of said reflector elements being of a size end location on said support tube to allow some of said emitted ultrasonic waves to pass by it until the innermost reflector is reached, the transit times of emitted ultrasonic waves reflected from each reflector providing a separate measurement of gas characteristics over the propagation path from said first subassembly individual ultrasonic transducer to each of said reflectors and back to said subassembly second individual transducer.

13. Apparatus in accordance with claim 4 including an ultrasonic transducer subassembly mounted within one of said nozzles in place of one of said first and second ultrasonic transducers, said subassembly comprising first and second subassembly transducers propagating ultrasonic waves into said flowing gas, a reflecting member positioned to reflect ultrasonic waves from one of said subassembly ultrasonic transducers to the other of said subassembly ultrasonic transducers, said reflecting member being mounted on a support tube extending inwardly from said subassembly, said reflecting member being adjustable to any one of a series of radial positions over a distance P which is only a fraction of said stack diameter to provide for a series of measurements of ultrasonic characteristics of said flowing gas.

14. Apparatus in accordance with claim 4 and further including a subassembly for mounting within one of said nozzles to hold one of said ultrasonic transducers, said subassembly comprising, an outer flanged tube from said nozzle in a direction generally normal to said vertical axis and retractable within said nozzle, first and second probe ultrasonic transducers, each mounted on the end of one of said probe tubes away from said nozzle in facing relationship with one another and defining a path P between said two probe ultrasonic transducer faces, and means for exciting one of said probe ultrasonic transducer to generating ultrasonic waves to he propagated toward the other of said probe transducers to measure the acoustic characteristics over said path P through said gas.

15. Apparatus in accordance with claim 3 and further including a third transducer positioned at one end of a second diameter of said stack for emitting a beam of ultrasonic waves across said second diameter along an axis substantially normal to the vertical axis of said stack, and a fourth transducer positioned at the opposite end of said second diameter to detect ultrasonic waves incident upon it, and wherein said means for exciting said first transducer provides for exciting said third transducer in a predetermined time sequence.

16. Apparatus in accordance with claim 15 wherein each of said first, second, third and fourth transducers both emit an ultrasonic beam and detect ultrasonic waves incident upon them.

17. Apparatus in accordance with claim 4 wherein both of said nozzles are slanted downward from the point of entry of said nozzle to said stack wall.

18. Apparatus in accordance with claim 17 wherein the ultrasonic transducer in both of said nozzles emits a beam substantially normal to said vertical axis of said stack.

19. Apparatus in accordance with claim 3 and further including means for measuring acoustic velocity through said gas over a defined path P substantially shorter than said diameter, said means including an additional pair of ultrasonic transducers positioned to face each other and spaced apart by said distance P.

20. Apparatus in accordance with claim 19 and further including means for periodically introducing air from outside said stack to clean said additional pair of transducer faces.

21. Apparatus in accordance with claim 19 wherein of said additional pair of ultrasonic transducers is mounted to be adjustable along a diameter of said stack to different selected radial positions across said stack.

22. Apparatus in accordance with claim 21 wherein said additional pair of ultrasonic transducers are mounted to be slidably adjusted along a diameter of said stack to a radial position displaced from said wall and wherein said means includes a temperature sensing device positionable at said radial position.

23. An apparatus in accordance with claim 2 wherein said second ultrasonic transducer is located adjacent to said first ultrasonic transducer.

24. Apparatus in accordance with either of claims 3 or 23 wherein both said first and second ultrasonic transducers can each, emit a beam of ultrasonic waves and detect ultrasonic waves incident upon it, and wherein said means for exciting said first ultrasonic transducer to emit ultrasonic waves also provides for exciting said second ultrasonic transducer to emit ultrasonic waves.

25. Apparatus in accordance with any one of claims 2, 3 and 23 wherein at least one of said transducers is a clamp-on transducer.

26. Apparatus in accordance with any one of claims 2, 3 and 23 wherein a platform for support of installation and maintenance of said transducers is erected around said stack at a vertical position proximate to the position of said first and second transducers.

27. Apparatus in accordance with any one of claims 2, 3 and 23 wherein said transducers are capable of operating at ambient temperatures up to 175° C.

28. Apparatus in accordance with any one of claims 2, 3 and 23 wherein said apparatus further includes a non-ultrasonic temperature sensing element positioned to determine the temperature of gas within said stack.

29. Apparatus in accordance with any one of claims 2, 3 and 23, and further including ultrasonic means for determining cross flow of gas within said stack at substantially the vertical location of said first and second transducers.

30. Apparatus in accordance with claim 23 and further including a sound reflecting member positioned vertically to receive ultrasonic waves from said first ultrasonic transducer and reflect them to said second ultrasonic transducer, said reflector being adjustable to any of a series of radial positions across said stack diameter.

31. Apparatus in accordance with either of claims 3 or 23 wherein said first transducer is an ultrasonic transducer subassembly comprised of a plurality of individual ultrasonic transducers, at least two of said plurality of individual ultrasonic transducers being acoustically isolated from one another, and means for sensing acoustic waves transmitted radially from one of said two acoustically isolated ultrasonic transducers to the other of said two acoustically isolated ultrasonic transducers to perform a short path measurement of acoustic transmission characteristics of said gas flowing through said stack over the path P between said two ultrasonic transducers for measuring an acoustic characteristic of said gas flowing vertically up in said stack.

32. Apparatus in accordance with any one of claims 2, 3 and 23 wherein said distance L is substantially zero.

33. An apparatus for monitoring volumetric flow rate of gases through a hollow stack having an extended vertical axis wherein the diameter of said stack is greater than about three meters comprising,
   a first clamp-on ultrasonic transducer positioned to emit ultrasonic waves propagated from the interior wall of said stack in a direction angled away from a direction normal to said stack vertical axis,
   a reflecting member mounted within said stack and positioned to intercept ultrasonic waves emitted from said first ultrasonic transducer,
   a second clamp on ultrasonic transducer positioned at the opposite end of a stack tilted diameter from said first ultrasonic transducer in a location where it receives ultrasonic waves emitted from said first ultrasonic transducer which are reflected from said reflecting member, said second clamp on ultrasonic transducer being oriented to propagate ultrasonic waves to reflect from said reflecting member in a direction where they are received by said first ultrasonic transducer, said second transducer being vertically displaced from said first transducer by a distance L which is a fraction of said diameter, not exceeding about two meters, and
   means for exciting said first transducer in a controlled time sequence, and for providing an output signal indicative of the transit time from said first transducer of ultrasonic waves reflected by said reflecting member and received by said second transducer.

34. An apparatus for monitoring volumetric flow rate of a gas flowing through a hollow stack having an extended vertical axis comprising,
   a first ultrasonic transducer assembly positioned to direct an ultrasonic beam from said stack wall across said stack at a vertical position displaced from the bottom of said stack,
   a second ultrasonic transducer assembly positioned to receive ultrasonic waves emitted from said first ultrasonic transducer, said second ultrasonic transducer being displaced vertically from said first ultrasonic transducer by a distance L which is a fraction of said diameter, not to exceed about two meters, said first transducer emission being such that a detectable portion of ultrasonic waves from said beam emitted by said first transducer impinges upon said second transducer,
   means for exciting said first transducer in a time sequence, and for providing an output signal indicative of a transit time from said first transducer of ultrasonic waves received by said second transducer,
   and wherein at least one of said ultrasonic transducers comprises a small aperture transducer mounted to direct ultrasonic waves outwardly toward said stack wall and a reflector positioned to receive ultrasonic waves emitted from said transducer and reflect them in a substantially collimated beam back across said stack diameter.

35. Apparatus in accordance with claim 34 wherein said reflector is parabolic.

36. Apparatus in accordance with claim 35 wherein said reflector is spherical.

37. An apparatus for monitoring volumetric flow rate of a gas flowing through a hollow stack having an extended vertical axis comprising,
   a first ultrasonic transducer assembly positioned to direct an ultrasonic beam from said stack wall across said stack at a vertical position displaced from the bottom of said stack,
   a second ultrasonic transducer assembly positioned to receive ultrasonic waves emitted from said first ultrasonic transducer, said second ultrasonic transducer being displaced vertically from said first ultrasonic transducer by a distance L which is a fraction of said diameter, not to exceed about two meters, said first transducer emission being such that a detectable portion of ultrasonic waves from said beam emitted by said first transducer impinges upon said second transducer,
   means for exciting said first transducer in a time sequence, and for providing an output signal indicative of a transit time from said first transducer of ultrasonic waves received by said second transducer,
   and wherein at least said first ultrasonic transducer is formed of an array of a plurality of individual ultrasonic transducers, each of said individual ultrasonic transducers having an emitting face in a plane parallel to said extended vertical axis of said stack and,
   wherein said means for exciting said first transducer includes a variable frequency generator varying its frequency in a predetermined pattern, each of said individual transducers being coupled to said frequency generator through individual phase shift circuits, each phase shift circuit being characterized by a different phase shift response, said predetermined pattern of frequency variation and said individual phase shift circuit characteristic being selected to provide that the composite of ultrasonic waves from said array of individual transducer is steered along an axis which differs from an axis normal to said extended vertical axis of said stack.

38. Apparatus in accordance with claim 37 wherein said variable frequency generator is a chirping circuit.

39. A method of monitoring the volumetric gas flow rate through a substantially vertically oriented stack comprising the steps of,
   (a) emitting a beam of ultrasonic waves from a first position above the bottom of said stack, across a diameter of said stack, said beam being emitted along a central axis of propagation normal to the vertical axis of said stack;
   (b) sensing said emitted ultrasonic beam at a second position vertically displaced from said emission position by a distance L equal to the stack diameter times the tangent of the half angle, $\theta_h$, of the emitted beam,
   the variations in the transit time between emitting and sensing in said sensing step providing a measurement of the gas flow velocity along said vertical axis of said stack.

40. A method in accordance with claim 39 including the further steps of, (c) emitting a second beam of ultrasonic waves from a third position at the same vertical level as said first position, said third position being displaced circumferentially from said first position, said beam being emitted along an axis substantially normal to said vertical axis of said stack, and (d) sensing said second emitted beam at a position vertically displaced from the said third position by a distance L equal to the stack diameter times the tangent of the half angle of the emitted beam.

41. A method in accordance with either of claims 39 or 40 wherein each of said beams are emitted by transducers which act as both a detector and an emitter for ultrasonic waves.

42. A method in accordance with claim 40 including a step of measuring the temperature of said gas flowing in said stack, said temperature measurement not being based upon ultrasonic emission, and wherein said temperature measurement is made in said stack at a vertical position substantially the same as the vertical position of emission of one of said ultrasonic beams and wherein said detection of said ultrasonic waves as indicative of vertical gas flow is corrected for temperature variations by means of said measured temperature of said gas.

43. A method of monitoring the volumetric gas flow rate through a substantially vertically oriented stack comprising the steps of,
(a) emitting a beam of ultrasonic waves from a position above the bottom of said stack, across a diameter of said stack, said beam being emitted along a central axis of propagation normal to the vertical axis of said stack;
(b) sensing said emitted ultrasonic beam at a position at the opposite end of said stack diameter from said emission position, said position being at substantially the same vertical position as said emission position;
the variations in the transit time between emitting and sensing in said sensing step providing a measurement of the gas flow velocity along said vertical axis of said stack.

44. A method of monitoring the volumetric gas flow rate through a substantially vertically oriented stack comprising the steps of,
(a) emitting a beam of ultrasonic waves from a position substantially above the bottom of said stack, across a diameter of said stack, said beam being emitted along a central axis of propagation normal to the vertical axis of said stack;
(b) sensing said emitted ultrasonic beam at a position vertically displaced from said emission position by a distance L which is a fraction of said stack diameter, not exceeding about two meters,
the variations in the transit time between emitting and sensing in said sensing step providing a measurement of the gas flow velocity along said vertical axis of said stack.

45. Method in accordance with claim 44 wherein said emitting step and said sensing step are carried out at positions adjacent to one another.

* * * * *